United States Patent [19]

David et al.

[11] Patent Number: 4,575,843
[45] Date of Patent: Mar. 11, 1986

[54] TIME-DIVISION-MULTIPLEXING LOOP TELECOMMUNICATION SYSTEM HAVING A FIRST AND SECOND TRANSMISSION LINE

[75] Inventors: Guy A. J. David, Thiaia; Jean-Claude Grima, Chatillon; Bernard Pando, Versailles; Gabriel C. O. Bretez, Bagneux; Daniel J. F. Lommer, Velizy-Villacoubly, all of France

[73] Assignee: U.S. Philips Corporation, New York, N.Y.

[21] Appl. No.: 578,252

[22] Filed: Feb. 7, 1984

[30] Foreign Application Priority Data

Feb. 7, 1983 [FR] France .................... 83 01866

[51] Int. Cl.⁴ .................................... H04J 3/14
[52] U.S. Cl. ......................... 370/16; 370/88
[58] Field of Search ............ 370/88, 16; 340/825.05

[56] References Cited

U.S. PATENT DOCUMENTS

| | | | |
|---|---|---|---|
| 3,519,750 | 7/1970 | Beresin et al. | 370/16 |
| 3,652,798 | 3/1972 | McNeilly | 370/16 |
| 3,859,468 | 1/1975 | Smith et al. | 370/16 |
| 4,398,271 | 8/1983 | Cretin et al. | 370/16 |

FOREIGN PATENT DOCUMENTS

| | | | |
|---|---|---|---|
| 2256605 | 7/1975 | France | 370/88 |
| 2049357 | 12/1980 | United Kingdom | 370/88 |

*Primary Examiner*—Douglas W. Olms
*Attorney, Agent, or Firm*—Thomas A. Briody; William J. Streeter; Leroy Eason

[57] ABSTRACT

A time-division-multiplexing loop telecommunication system has a first and a second transmission line for linking up a succession of connecting circuits and for supplying information, in a normal service direction of transmission, to subscriber circuits attached to the connecting circuits; these connecting circuits are provided with an input and an output for the connection of subscriber circuits, with up-line and down-line access points connected to the said lines. Typical of this system is that at the level of each connecting circuit provision is made for means of command for linking the input of the subscriber circuits to one of the up-line access points receiving the infromation, while the output is linked to the down-line access points.

11 Claims, 23 Drawing Figures

TIME-DIVISION-MULTIPLEXING LOOP TELECOMMUNICATION SYSTEM HAVING A FIRST AND SECOND TRANSMISSION LINE

BACKGROUND OF THE INVENTION

The present invention relates to a time-division-multiplexing loop telecommunication system comprising a first and a second transmission line for linking up a succession of connecting circuits and for supplying information (in a normal service direction of transmission) to subscriber circuits attached to the connecting circuits, these connecting circuits being provided with an input and an output for the connection of subscriber circuits, with up-line and down-line access points connected to the said lines.

A system of this kind is described in French patent application No. 2 256 605 filed in the name of Telecommunications Radioelectriques et Telephoniques T.R.T. on Dec. 26, 1973. This system, as soon as a failure is detected, sets in motion a whole process to re-establish the most satisfactory operation possible taking account of the said failure. This process is the same whatever the nature of the failure.

The present invention sets out to perfect this known device by implementing simpler processes to remedy certain failures, notably a break in the line separating two connecting circuits.

SUMMARY OF THE INVENTION

In this respect a system of the type described in the preamble is noteworthy in that it is provided at the level of each connecting circuit with means of command for linking the input of the subscriber circuits to one of the up-line access points receiving the information while the output is linked to the down-line access points.

Thus, in the invention the two lines transmit the information in the same direction while the system functions normally.

This measure prescribed by the invention is not incompatible with those prescribed in the above-quoted patent application. According to an important characteristic of the invention, a telecommunication system provided with at least one pilot circuit, inserted in the same way as the connecting circuits, coupled to means of detecting failures in the system, means of generating order codes in the direction of the connecting and pilot circuits for remedying the failure of the system by connections between the access points and the inputs and outputs of the said circuits is noteworthy in that the means of generating order codes operate in accordance with the following so-called reconfiguration method:

sending of a down-line order word to all connecting and pilot circuits for preparing the return, in the direction opposite to the aforesaid direction of transmission, of the signal sent out by the pilot circuit;

successive sending of private down-line order codes to each of the connecting circuits, beginning with that which is situated furthest away in order that the first circuit to receive this order will return it along a transmission line to the pilot circuit, the signal subsequently being sent from the down-line side;

successive sending of private up-line order codes to each of the connecting circuits, beginning with the one situated down-line of the one which has executed the private down-line order code;

implementation of the system by which the pilot circuit receives the signal from the up-line side in order that the exchange of information in the subscriber circuits can take place.

It will be realised that one transmission line always transmits the information in the same direction, while the other transmits it in both directions, depending on whether the system is functioning normally or whether the procedure described above has been executed.

According to an important characteristic of the invention, a loop telecommunication system of the type referred to in the preamble is noteworthy in that at least one supplementary transmission line can be coupled to the first and/or to the second line and may be connected to supplementary access points provided in the connecting and pilot circuits.

This makes such a system particularly advantageous when it is used in an aggressive environment or when breaks in cables are to be feared. This is especially the case when the system is installed in a warship.

The following description, referring to the appended drawing and the whole being given by way of nonlimitative example, will elucidate how the invention may be realised.

DESCRIPTION OF THE DRAWING

FIG. 3 shows a telecommunication system reconstituted after a cable break.

DESCRIPTION OF THE PREFERRED EMBODIMENTS

Figure 1:
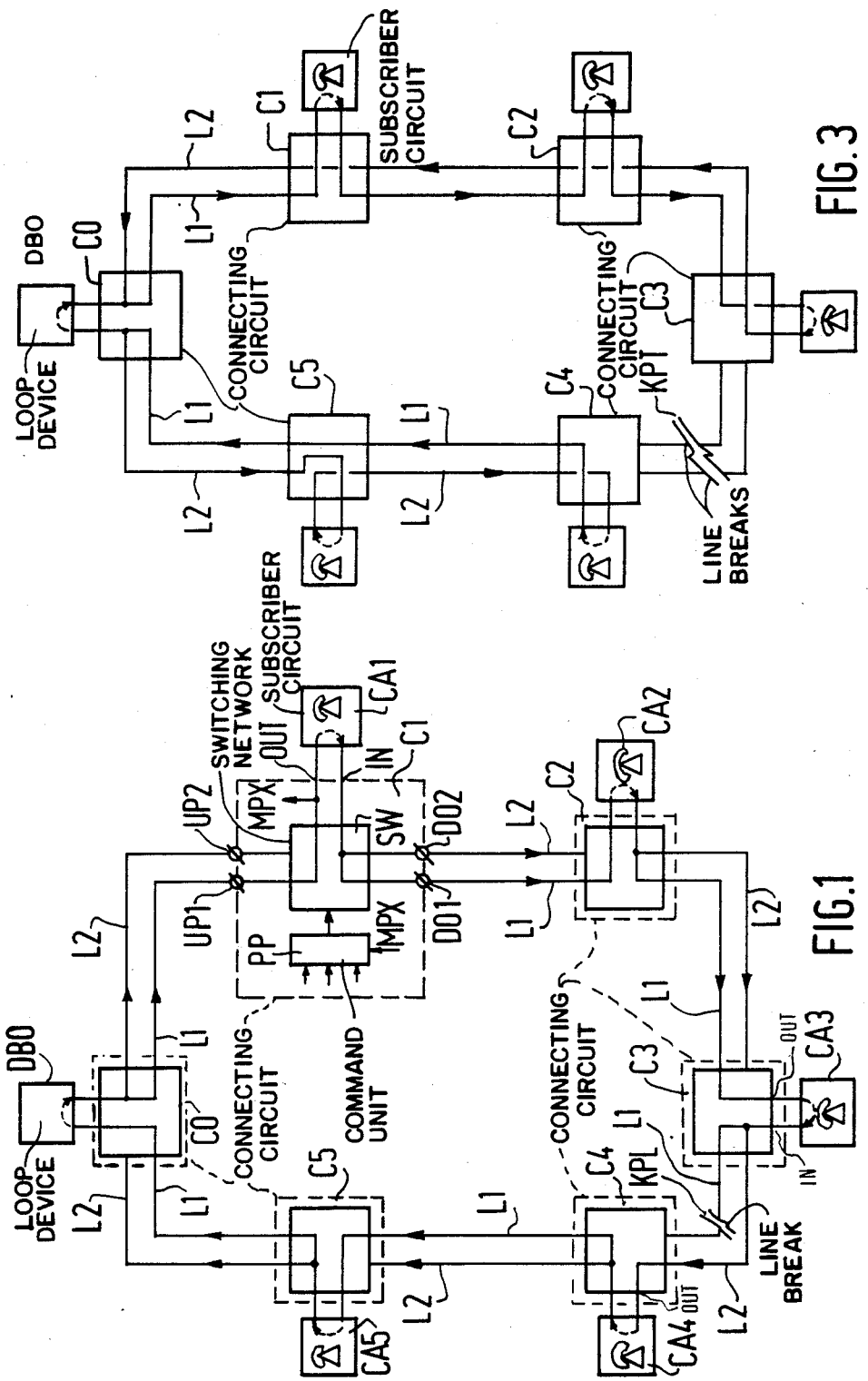
FIG. 1 shows a telecommunication system in conformity with the invention in normal operation.
Figure 2:
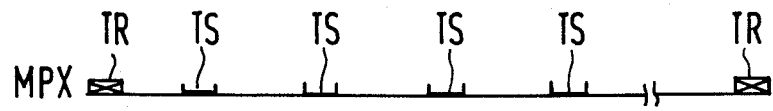
FIG. 2 shows the organisation of the multiplex transmitted by the telecommunication system.

The telecommunication system shown in FIG. 1 comprises two lines L1 and L2 for joining up between them the connecting circuits C1, C2, C3, C4 and C5. By means of these connecting circuits, information may be exchanged between subscriber circuits one or more of which are attached to a connecting circuit. For clarity in the figures, only a single subscriber circuit per connecting circuit has been drawn, the subscriber circuit CA1 being attached to the connecting circuit C1, the subscriber circuit CA2 to circuit C2, and so on up to the subscriber circuit CA5 attached to the connecting circuit C5. In this system the information is transmitted by digital time-division multiplexing MPX the organisation of which is shown in simplified form in FIG. 2. In this multiplexing, different time slots TS are attributed to octets designed, in the event of failure, to transmit information to remedy the failures. A reference time-slot TR contains a particular octet for marking these different time slots TS. The time slots comprised between these reference time slots TR or TS are utilised, in the event of a failure not being detected, for transmitting information between the different subscribers. To obtain loop transmission in multiplex, a loop device DBO is necessary. A device of this type is described in French Patent Application No. 2 165 182 filed by the Applicant. The lines L1 and L2 are connected to this device DBO by a connecting circuit C0 in the same way as the subscriber circuits. When the system is functioning normally, that is to say when no failure exists, a direction of transmission may be defined. The loop device DBO generates multiplexing synchronizing signals which are in particular transmitted by the line L1 to the connecting circuit C1, then successively to the circuits C2, C3, C4 and C5 and finally return via circuit C0 to the loop device DBO. The access points UP1 and UP2 of the different connecting circuits C1, C2, ... are provided for connecting respectively the lines L1 and L2 coming from the up-line connecting circuit in the direction of transmission which has just been defined. These access points UP1 and UP2 are therefore called up-line access points. The access points DO1 and DO2 of the different connecting circuits C1, C2, ... are provided for connecting respectively the lines L1 and L2 coming from the down-line connecting circuit and are therefore called down-line access points. The subscriber circuits CA1, ..., CA5 are connected to the outputs OUT and to the inputs IN of the connecting circuits C1, ..., C5 to which they are attached. The inputs and outputs IN and OUT can be linked to the different access points UP1, UP2, DO1 and DO2 by means of a switching network SW controlled by a command unit PP.

In conformity with the invention, the command unit PP is provided for linking the output OUT of the connecting circuit to one of the up-line access points UP1 or UP2 receiving the information, while the input IN is linked to the down-line access points DO1 and DO2.

Referring to FIG. 1, one sees that the multiplex signals are transmitted, between the connecting circuits C0 and C1, both to line L1 and to line L2. The command unit will preferably connect the output OUT to the line L1, while the input IN will be connected to the lines L1 and L2.

The reason for this measure prescribed by the invention becomes evident if a break occurs in line L1. Such a break in line L1 is marked KPL between the connecting circuits C3 and C4. The command unit for circuit C4, not shown for this circuit, will operate in order that the output OUT of circuit C4 can be connected to the line L2. Thus, a failure of this type is overcome without difficulty.

If a more serious break occurs, for example a break KPT in two cables at the same time, as shown in FIG. 3 between the connecting circuits C3 and C4, a system reconfiguration procedure will be triggered, for example at the level of the loop device, as will be described in the following; a procedure of this type has been described in the above-quoted French Patent Application No. 2 256 605. The effect of this configuration is to leave the direction of transmission in line L1 unchanged whereas that in line L2 is reversed.

Figure 4:
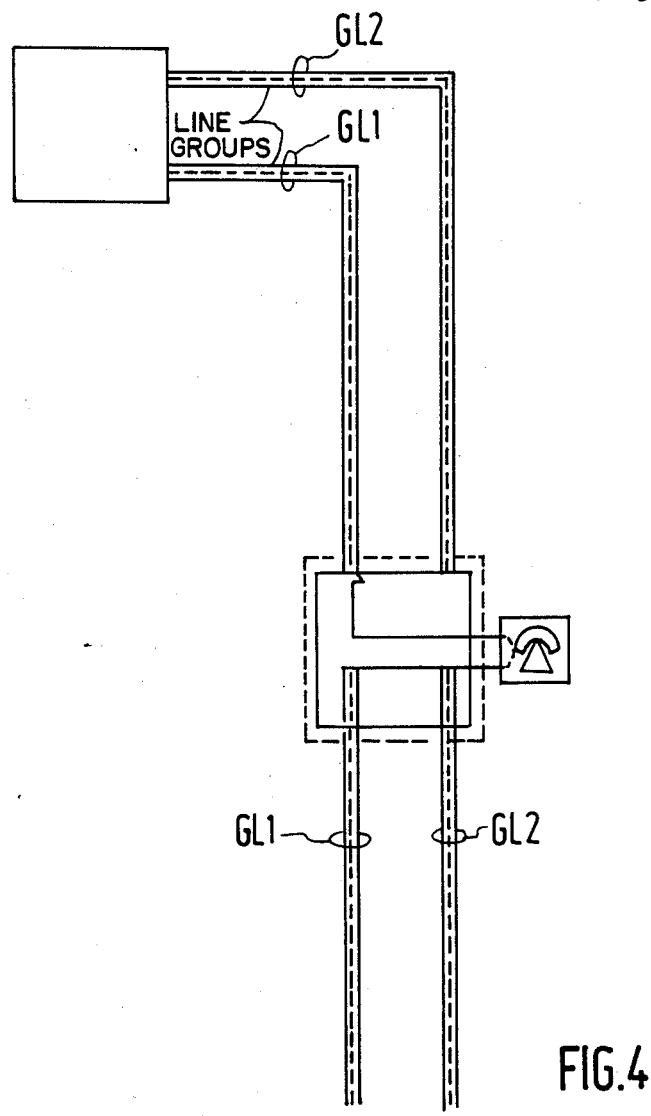
FIG. 4 shows part of a telecommunication system in conformity with the invention, presenting a large number of transmission lines.

In one mode of embodiment of the invention the number of lines can be multiplied. This is important when such a system is used in an aggressive environment and when breaks in cables are to be feared. This is in particular the case when the system is installed on a warship. The different lines are then contained in two groups GL1 and GL2 (see FIG. 4) which themselves may contain one or several lines. The group of lines GL1 always transmits the information in the same direction, while the group of lines GL2 transmits it either in one direction or in the other, depending on whether or not the reconfiguration procedure has been triggered.

In the following pages a more detailed description will be given of a system comprising groups of lines GL1 and GL2 each formed respectively of lines L11 and L12, for the one part, and of L21 and L22 for the other. For someone skilled in the art it will then be a simple matter to generalise the system for any number of lines contained in the groups. This system will comprise two loop circuits on the basis of which the reconfiguration procedure can be initiated.

Figure 5:
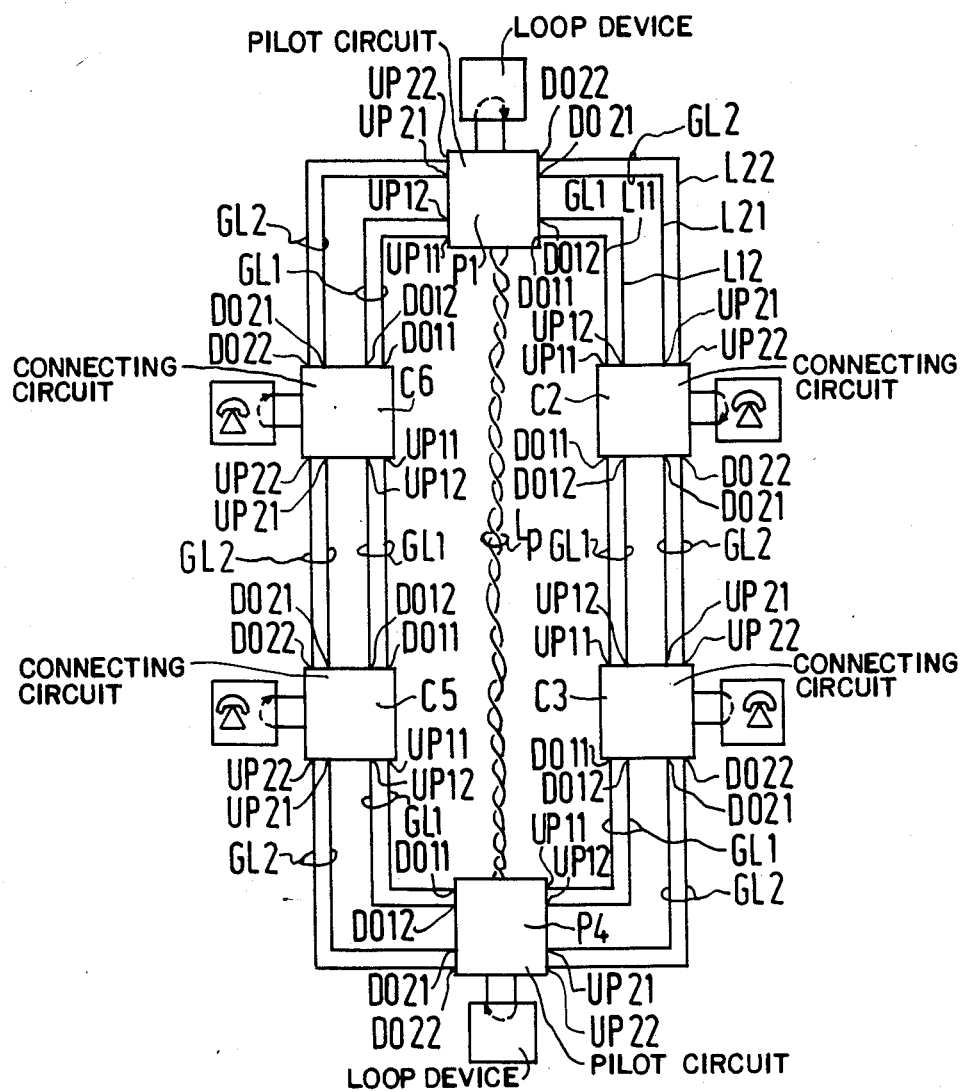
FIG. 5 shows a loop telecommunication system in conformity with the invention comprising notably, on the one hand, two first transmission lines and two second transmission lines and, on the other hand, two pilot circuits linked by a supplementary line.

This system is shown broadly in FIG. 5. The connecting circuits attached to the loop devices carry the references P1 and P4 and will henceforth be referred to as pilot circuits. These circuits are interconnected by a twisted pair Lp. Arranged between these pilot circuits P1 and P4 in the down-line direction from P1 to P4 are connecting circuits C2 and C3 and in the up-line direction from P4 to P1 the circuits C5 and C6. Also indicated in this figure are the different access points of the connecting circuits and of the pilot circuits; these access points carry the same reference for these different circuits. Thus, the access points driven from the down-line side carry the references: DO11, DO12, and DO22 and are connected respectively to the lines L11, L12, L21 and L22, and the access points driven from the up-line side carry the references UP11, UP12, UP21 and UP22 and are connected respectively to the lines L11, L12, L21 and L22.

Figure 6:
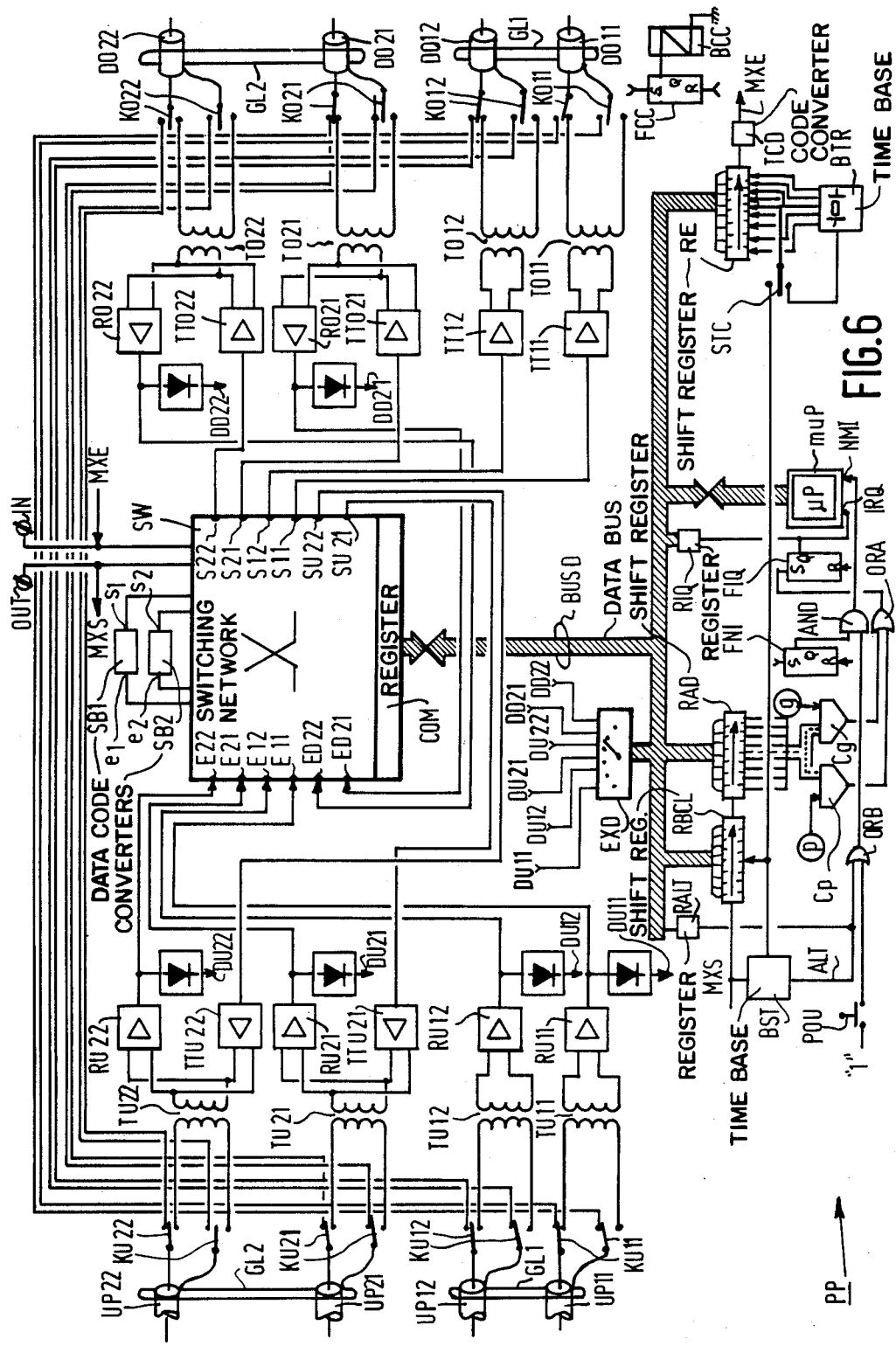
FIG. 6 shows in detail the method of embodiment of a connecting circuit.

FIG. 6 shows a connecting circuit more in detail.

An important feature of the invention is that the terminals UP11 and DO11 may be interconnected by the intermediary of contacts KU11 and KO11 of a short-circuit relay whose exciting coil carries the reference BCC; the terminals UP12 and DO12 may also be interconnected by the intermediary of contacts KU12 and KO12 of the same relay. Similarly, the terminals UP21 and DO21 may be interconnected by the intermediary of contacts KU21 and KO21 and the terminals UP22 and DO2 by the contacts KU22 and KO22. Thus, when coil BCC of this relay is not excited, the junction circuit becomes "transparent" for all information transported by the different lines L11, L12, L21 and L22.

When the contacts KU11, KO11, KU12, KO12, KU21, KO21, KU22 and KO22 are closed, line L11 is connected in the up-line direction to the primary of an isolating transformer TU11 and in the down-line direction to the secondary of another isolating transformer TO11, line L12 is connected in the up-line direction to the primary of an isolating transformer TU12 and in the down-line direction to the secondary of a transformer TO12, line L21 is connected in the up-line direction to the primary of a transformer TU21 and in the down-line direction to the secondary of a transformer TO21, and line L22 is connected in the up-line direction to the primary of a transformer TU22 and in the down-line direction to the secondary of a transformer TO22. The secondary of the transformer TU11 is connected, through the intermediary of an amplifier RU11, to the input E11 of the switching network SW, the secondary of transformer TU12 is connected, through the intermediary of an amplifier RU12, to the input E12 of the switching network SW. The primary of the transformer TO11 is connected, through the intermediary of an amplifier TT11, to the output S11 of the switching network SW and the primary of the transformer TO12 is connected, through the intermediary of an amplifier TT12, to the output S12 of the switching network SW. The secondary of the transformer TU21 is connected, on the one hand, through the intermediary of an amplifier RU21, to the input E21 of the network SW and, on the other hand, through the intermediary of an amplifier TTU21, to the output SU21 of the switching network SW. The secondary of the transformer TU22 is connected, on the one hand, to the intermediary of an amplifier RU22, to the input E22 of the network SW and, on the other hand through the intermediary of an amplifier TTU22, to the output SU22 of SW. The primary of the transformer TO21 is connected, on the one hand, through the intermediary of an amplifier RO21, to the input ED21 of SW and, on the other hand through the intermediary of an amplifier TTO21, to the output S21 of SW. The primary of the transformer TO22 is connected, on the one hand, through the intermediary of an amplifier RO22, to the input ED22 of the switching network SW and, on the other hand, through the intermediary of an amplifier TTO22, to the output S22 of the network SW. The different amplifiers RU11, RU12, RU21, RU22, RO21 and RO22 amplify the signals received in order that at their outputs the level of these signals may be treated by the switching network SW built as a TTL logic circuit, while the amplifiers TT11, TT12, TTO21, TTO22, TTU21 and TTU22 amplify the signals at the output of the network SW in order that the propagation along the different lines may be effected in a suitable manner.

The data sent along the lines are biphase coded, and in order that the data transmitted in this code can be processed, there are two conversion devices SB1 and SB2 provided respectively with inputs e1 and e2 and with outputs s1 and s2, also connected to the switching network SW; at the terminal OUT, to which is connected the line MXS, there appear the data converted by one or other of the devices SB1 and SB2 and, at the terminal IN, to which is connected the line MXE, there appears the multiplex biphase signal, the terminals IN and OUT also being connected to the switching network SW.

The different switching operations to be carried out within the system are defined by means of words contained in a register COM linked with SW; these words are supplied by a microprocessor muP forming part of the command unit PP. These words are sent along a data bus BUSD. The various figures appended to the present description explicitly elucidate the different switching operations, and will enable any person skilled in the art to build this network SW, for example by means of FPLA logic networks.

Various detectors supply the lines DU11, DU12, DU21, DU22, DD21 and DD22 with signals indicating the presence of signals received at respectively the access points UP11, UP12, UP21, UP22, DO21 and DO22. These detectors are connected respectively to the outputs of the amplifiers RU11, RU12, RU22, RO21. They are constituted, for example, by monostable triggering circuits in such a way that, if the transitions of the signals applied to their inputs appear at a sufficiently rapid rate, the circuits remain in their monostable state; if there is no transition, they switch to their other state. The lines DU11, DU12, DU21, DU22, DD21 and DD22 are connected, through the intermediary of a switch EXD, to the bus BUSD. The position of the switch EXD is defined by an address code produced by the microprocessor muP in a manner which it is not necessary to describe in detail. The microprocessor muP has access to two shift registers RBCL and RAD circuited in cascade, with the input of the first of these registers RBCL being connected to the line MXS; it is systematically loaded with binary elements (bits) contained in the time slots TS (see FIG. 2); for this purpose, as also in the register RAD, the input of the shift register is connected to the output of a time base BST. In order that this time base may determine the time slots TS, it has to detect, as is well known, the frame code contained in the reference time slots TR; if it fails to detect these frame codes, it supplied a signal on the line ALT. The microprocessor muP also has access to a shift register RE whose output is connected to a code converter TCD for delivering data in biphase code to the line MXE. The shift command for this register is also connected to the time base BST. The register RE may also be loaded with frame codes for sending them into the time slots TR; this is done by an auxiliary time base BTR which also supplies the shift signals to this register RE; a switch STC places the register RE under the control of this time base BTR when it is in one position, and under the control of the time base BST when it is in its other position. Different flip-flops FCC, FIQ, FNI are accessible to the microprocessor muP; the flip-flops FCC and FNI may be placed in their first state by means of address codes and in their second state by means of other address codes; the flip-flop FIQ may be placed in its first state by a signal supplied by a gate ORA and in its second state by an address code. The gate ORA effects the logic OR operation of two signals supplied by comparators Cp and Cg; these comparators make a comparison between the contents of the register RAD and respectively the words "p" and "g", the word "g" being a word common to all the connecting circuits and the word "p" being a word peculiar to each connecting circuit. The microprocessor muP has two interruption inputs IRQ and NMI, the input IRQ being connected to the output Q of the flip-flop FIQ, and the input NMI being connected to the output of an AND gate with two inputs, the first of which is connected to the output of the flip-flop FNI and the second to the output of a gate ORB with two inputs; the first input of this gate is connected to the line ALT, and the second is connected to the contact of a pushbutton POU coupled to the cold start interrupter of the connecting circuit. A flip-flop RALT is provided for transmitting, along a wire of BUSD, the state of the signal transmitted along the wire ALT. Similarly, a flipflop RIQ is provided for transmitting along the bus BUSD the state of the output of the flip-flop FIQ.

The operation of such a circuit is defined by a program stored in a read-only memory forming part of the microprocessor muP. This operation will be explained with the aid of flow charts representing the stored program. The program in question is divided into two parts. The first part is started by a signal applied to the input NMI and the second part is started by a signal applied to the input IRQ.

Figure 7:
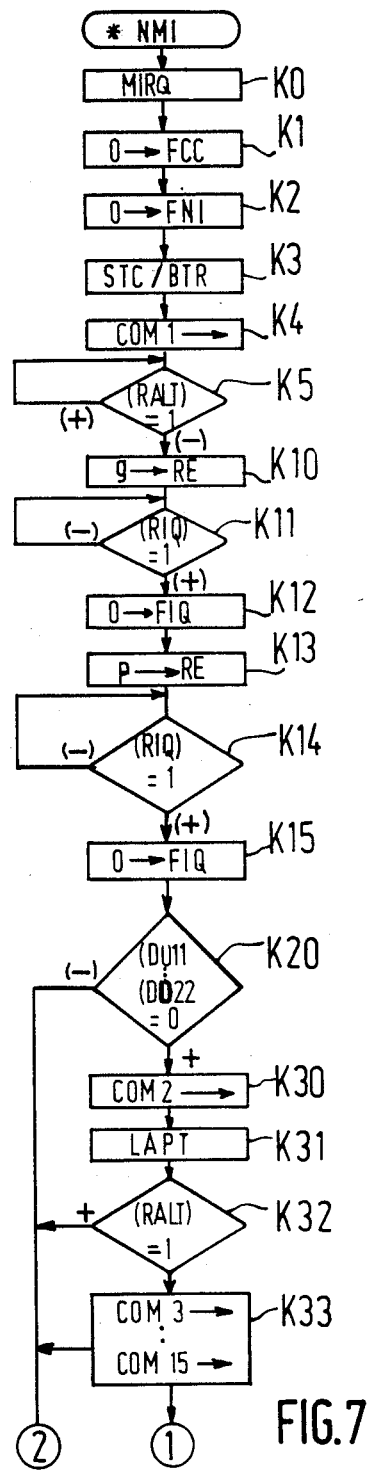
FIGS. 7, 8 and 9 show flow charts representing the operation of the connecting circuits schematised in FIG. 6.
Figure 8:
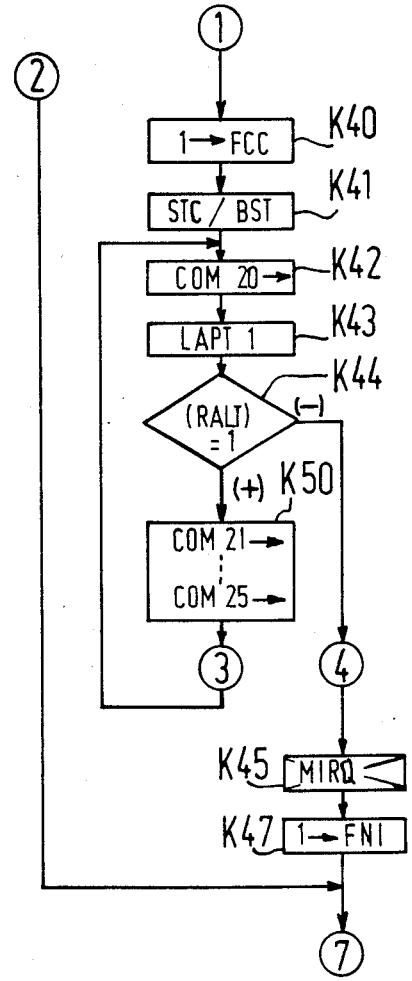

We begin by explaining the first part (flow chart in FIGS. 7 and 8). The signal at the input NMI only appears if an active signal is transmitted by the line ALT or if the pushbutton POU has been pressed (cold start case). In the box KO, first operation, the interruptions capable of being triggered by the signals applied to the input IRQ are masked. Next, the box K1 of the flow chart given in FIG. 7 indicates the second operation controlled by the microprocess muP; this second operation consists in setting to zero the flip-flop FCC, which suppresses the exciting current for the coil BCC if it was already excited. To reset this flip-flop to zero, it suffices to allocate an address code peculiar to its input R and to cause an active signal to appear at this input R by means of a decoder connected to the address bus of the microprocessor muP; this is well known in the technology and to give details of this type of circuit would only complicate the figures. In the same way, the flip-flop FNI is set to zero (box K2), and thus the active signals subsequently appearing on the line ALT do not lead this part of the program to its beginning since the AND gate is closed.

Next the operation indicated in box K3 is performed, that is to say the register RE is made dependent on the time base BTR; thus, the frame codes are approximately sent out in the reference time slots TR, after which the operation indicated in box K4 is performed; a word COM1 is sent into the register COM linked to the switching network SW. This word COM1 triggers a switching operation indicated in Table I below; this switching operation makes it possible in particular to verify the proper operation of SB1 and SB2 which are connected end to end; a period of waiting ensues until the time base BST is synchronised to the codes supplied by the time base BTR; for this purpose a test is made (box k5) of the contents of the register (RALT). When this is equal to "1" it means that synchronisation has not been obtained; as soon as it has been obtained, the program moves on to the next test which consists in verifying the proper operation of the recognition of addresses "g" and "p". For this purpose, in box K10, the word "g" is placed in the register RE and one waits until the output signal from the flip-flop RIQ goes to "1" (box K11), which indicates that the code "g" has been properly detected; next, in box K12, the flip-flop FIQ is set to zero; the operation in box K13 consists in placing in the register RE the code "p" and in the box K14 one waits until the signal at the output of the flip-flop RIQ goes to 1, indicating the proper recognition of the code "p", after which, in box K15, the flip-flop FIQ is reset to zero.

Another test indicated in box K20 consists in verifying that the signals on the lines DU11, DU12, DU21, DU22, DD21 and DD22 are all equal to zero, which means to say that no signal has been present at the inputs of the detectors. If this is the case, one proceeds to the end of this first part of the program, which is to say that no other operation has been undertaken.

TABLE I

| Switching word | Switching operations performed within the network SW |
|---|---|
| COM1 | IN-e2; s2-e1; s1-OUT |
| COM2 | IN-S21; IN-S22; e2-ED21; s2-OUT |
| COM3 | IN-S21; IN-S22; e2-ED22; s2-OUT |
| COM4 | IN-S21; IN-S22; e1-ED21; s1-OUT |
| COM5 | IN-S21; IN-S22; e1-ED22; s1-OUT |
| COM6 | IN-SU21; IN-SU22; e2-E21; s2-OUT |
| COM7 | IN-SU21; IN-SU22; e2-E22; s2-OUT |
| COM8 | IN-SU21; IN-SU22; e1-E21; s1-OUT |
| COM9 | IN-SU21; IN-SU22; e1-E22; s1-OUT |
| COM10 | IN-S11; IN-S22; e1-E11; s1-OUT |
| COM11 | IN-S11; IN-S12; e1-E12; s1-OUT |
| COM12 | IN-S11; IN-S12; e2-E11; s2-OUT |
| COM13 | IN-S11; IN-S12; e2-E12; s2-OUT |
| COM14 | IN-e1; s1-OUT |
| COM15 | IN-e2; s2-OUT |

Next, beginning at box K30, a test is made to determine whether the synchronisation of the time base BST can be obtained for different switching operations made in the network SW; in this box K30 the word COM2 is sent into the register COM; a sufficient time is allowed to elapse LAPT (box K31) for synchronisation to be obtained; a test is then made in box K32 to see whether it has in fact been obtained, and if it has not, one goes to the end of this first part of the program. If it has, the same trials are then made for the words COM3 to COM15. If all these latter tests prove conclusive, the access terminals of the connecting circuits are no longer placed in short circuit; for this, the operation indicated in box K40 (FIG. 8) places the flip-flop FCC in state 1, thereby exciting the coil BCC, after which, in box K41, the register RE is made dependent on the time base BST; the word COM20 is sent (box K42) into the register COM, triggering the switching operations indicated in Table II below.

TABLE II

| Switching word | Switching operations performed within the network SW |
|---|---|
| COM20 | IN-S11; IN-S12; IN-21; IN-S22; E11-e1; s1-OUT |
| COM21 | IN-S11; IN-S12; IN-S21; N-S22; E12-e1; s1-OUT |
| COM22 | IN-S11; IN-S12; IN-S21; IN-S22; E21-e1; s1-OUT |
| COM23 | IN-S11; IN-S12; IN-S21; IN-S22; E22-e1; s1-OUT |
| COM24 | IN-SU21; IN-SU22; ED21-e1; s1-OUT |
| COM25 | IN-SU21; IN-SU22; ED22-e1 s1-OUT |

A certain time is allowed to elapse LAPT1 (box K43) before testing the flip-flop RALT to determine whether synchronisation of the time base BST has been obtained (box K44). If it has, one moves on to the box K45 which indicates the operation of removing the mask on the operations IRQ and the flip-flop FNI is switched to state 1 to let signals that may be present pass to the input NMI (box K47). If synchronisation has not been obtained, different words, COM21 to COM25, will be tried (box K50). If synchronisation has still not been obtained after the word COM25, the word COM20 is tried once again. The output of the flow chart in FIG. 8 takes place at point 7.

Figure 9:
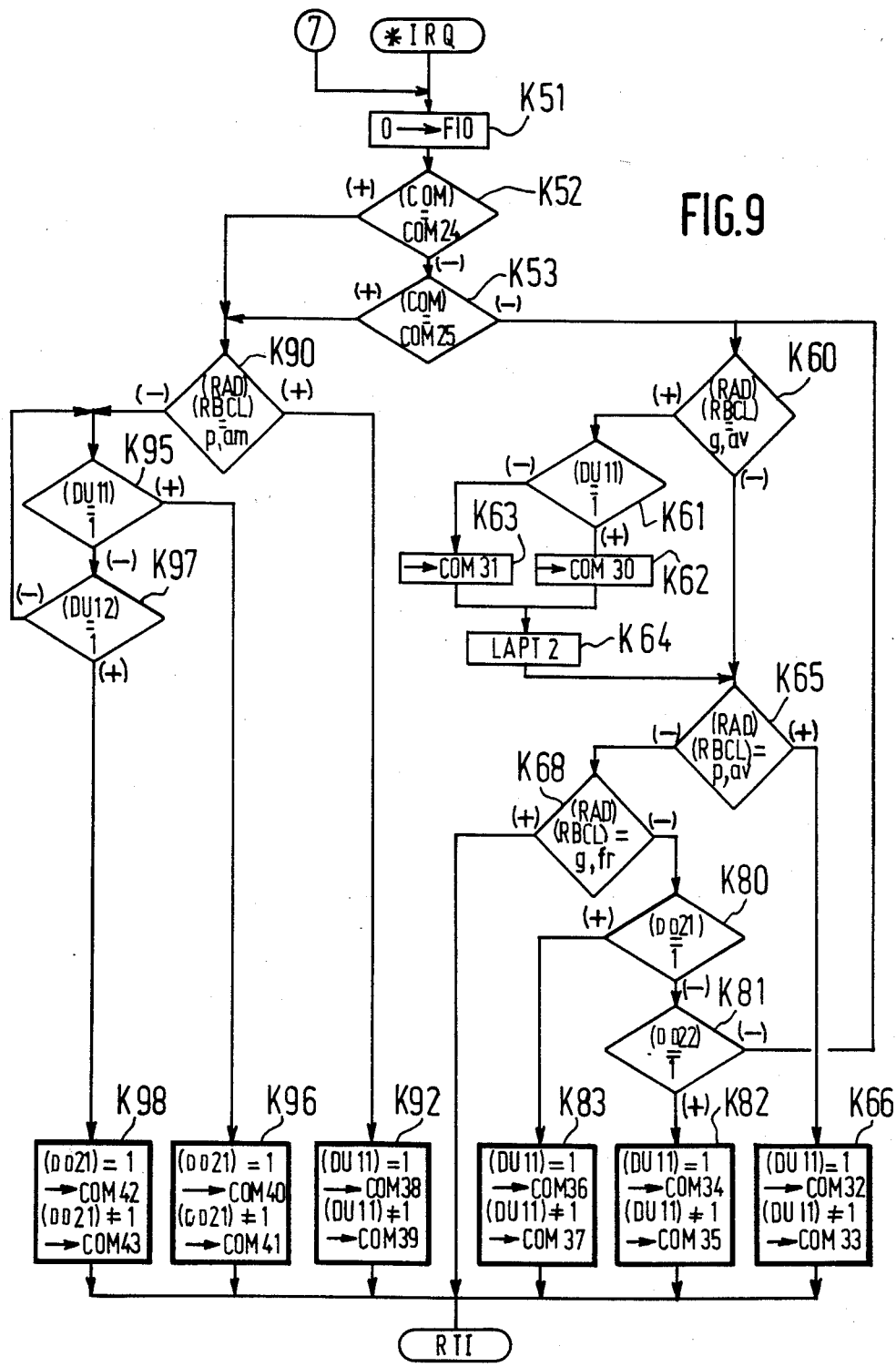

The second part of the program shown in FIG. 9 can be the sequel of the program for which the flow chart is shown in FIG. 8; it may be started again, as we have already seen, by a signal appearing at the input IRQ.

This is triggered by the appearance of a general address code "g" or a particular address code "p" contained in the register RAD. Before examining the contents of this register, preliminary operations are carried out. First of all, the flip-flop FIQ is set to zero (box K51); in boxes K52 and K53 the program examines whether the word contained in the register COM is the word COM24 or the word COM25. The program then divides into two branches depending on whether one has to do with two words or not.

One of these branches begins at box K60 and concerns the case whether the word contained in the register COM is neither the word COM24 nor the word COM25. In this box the contents of the registers RAD and RBCL are examined and compared with respectively the word "g", already defined, and a certain order word "av"; if the result is positive, the test indicated in box K61 is carried out, which consists in verifying the presence of a signal at the access point UP11, which translates into an active signal on the line DU11. The presence of signal at this access point triggers the emission (box K62) of the word COM30 in the register COM (see Table III below). If there is no signal at this access point, it is implicitly admitted that the signals are present at the access point UP12, and the word COM31 is sent into the register COM (box K63). After the operations indicated in boxes K62 and K63, a certain time LAPT2 is waited (box K64) during which the contents of registers RAD and RBCL are capable of changing. If the contents of these registers are identified with the word "p" and with the word "av" (box K65), the program then passes to the box K66 where, depending on whether a signal is present on the line DU11 or not, the word COM32 or COM33 is sent. If the contents of the registers RAD and RBCL do not identify with "p", "av" one then examines whether they identify with "g", "fr" (box K68); if there is identification, one then passes to the end of the interruption program; if there is no identification, the next move is to box K80 where a test is made for the presence of a signal on line DO21; if there is no signal, a test is then made (box K81) for the presence of signal on line DD22; if there is no signal on the latter wire, a return is made to box K60. The presence of signal on line DD22 involves the emission of the word COM34 if a signal is present on wire DU11 or of the word COM35 if this signal is not present (box K82). The presence of signal on the wire DD21 (box K80) triggers the operations indicated in box K83; the word COM36 is sent into the register COM if an active signal is present on the wire DU11 or the word COM37 is sent into it if there is no signal.

The other branch of the program begins in box K90 and concerns the case where, in boxes K52 and K53, the register COM cintains the word COM24 or the word COM25.

TABLE II

| Switching word | Switching operations performed within the network SW |
| --- | --- |
| COM30 | IN-S11; IN-S12; E11-e1; s1-OUT; s2-SU22; s2-SU21 |
| COM31 | IN-S11; IN-S12; E12-e1; s1-OUT; s2-SU22; s2-SU21 |
| COM32 | IN-SU21; IN-SU22; E11-e1; s1-OUT |
| COM33 | IN-SU21; IN-SU22; E12-e1; s1-OUT |
| COM34 | IN-S11; IN-S12; E11-e1; ED22-e2; s2-SU21; s2-SU22; s1-OUT |
| COM35 | IN-S11; IN-S12; E12-e1; ED22-e2; s2-SU21; s2-SU22; s1-OUT |
| COM36 | IN-S11; IN-S12; E11-e1; ED21-e2; s2-SU21; s2-SU22; s1-OUT |
| COM37 | IN-S11; IN-S12; E12-e1; ED21-e2; s2-SU21; s2-SU22; s1-OUT |
| COM38 | IN-S11; IN-S12; ED21-e1; s1-OUT |
| COM39 | IN-S11; IN-S12; ED22-e1; s1-OUT |
| COM40 | IN-SU21; IN-Su22; ED21-e1; E11-e2; s2-s11; s2-S12; s1-OUT |
| COM41 | IN-SU21; IN-SU22; ED22-e1; E11-e2; s2-S11; s2-S12; s1-OUT |
| COM42 | IN-SU21; IN-SU22; ED21-e1; E12-e2; s2-S11; s2-S12; s1-OUT |
| COM43 | IN-SU21; IN-SU22; ED22-e1; E21-e2; s2-S11; s2-S12; s1-OUT |

In this box K90 a check is made to see whether the contents of the registers RAD and RBCL identify with the words "p" and "am"; if there is identification, the next step is to box K92, where the indicated operations consists in sending into the register COM the word COM38 if an active signal is present on the line DU11, or the word COM39 if there is no active signal on it. If the contents of the registers RAD and RBCL do not identify with "p", "am", a check is made in the box K95 for the presence of a signal on the line DU11; if a signal is present on this line, the operations indicated in box K96 are carried out, that is to say the transmission of the word COM40 is commanded, if there is an active signal on DD21, or the word COM41 if there is no active signal on this line. The fact that there is no signal on the line DU11 gives rise to a supplementary test for the presence of an active signal on DU12; the absence of a signal triggers a return to box K95; its presence leads to the operations indicated in box K98, that is to say to the transmission of the word COM42 or of the word COM43, depending on whether a signal is present or not on the wire DD21.

Figure 10:
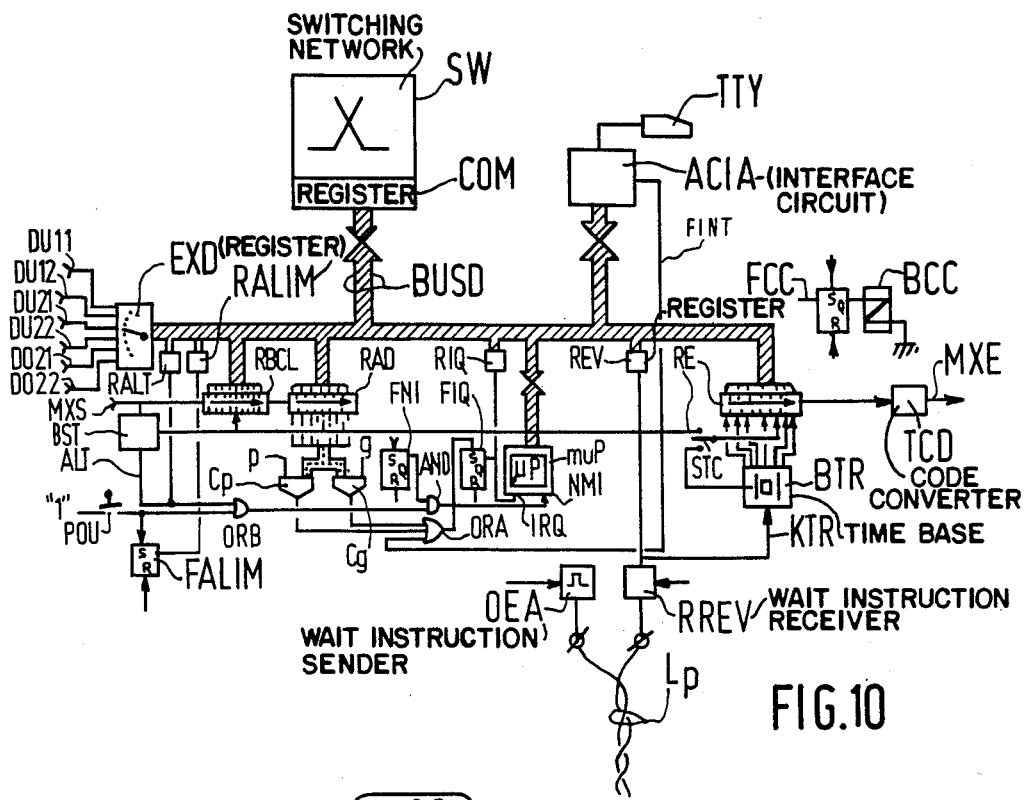
FIG. 10 shows in detail the method of embodiment of a pilot circuit.

FIG. 10 shows the modifications made to a connecting circuit to transform it into a pilot circuit. An important difference is that this circuit is equipped with a wait instruction sender carrying the reference OEA; this device sends via the line Lp a wait instruction for the second pilot circuit. This second pilot circuit, too, may send a wait instruction to the first pilot circuit; for this purpose the latter is provided with a wait instruction receiver RREV. The sender OEA is triggered by a certain address code generated by the microprocessor muP; the receiver RREV behaves as a flip-flop whose state may be checked through the intermediary of a register REV when the microprocessor muP generates the address code which is attributed to this register REV and when it is in the reading position; the flip-flop RREV may be reset to zero when the microprocessor generates another address code. The output signal of this flip-flop is applied to the intermediary of a wire KTR to the time base BTR; as soon as an active signal appears on this wire KTR, it has the effect of blocking the formation and the transmission of frame synchronisation codes TR. The pilot circuit comprises a flip-flop FALIM which is set to the active state when the general supply is connected; for this purpose its active state input is connected to the push-button POU. The state of this flip-flop may be checked by the microprocessor via a register RALIM. In the manner already indicated, the flip-flop FALIM may be reset to zero. Also provided is a teleprinter TTY, connected to the microprocessor muP through the intermediary of an interface circuit ACIA (for example the type 6805 made by MOTOROLA). As soon as a complete message is taped on the teleprinter, a signal produced by the ACIA circuit is transmitted along the wire FINT to a third input with which the gate ORA is provided.

The pilot circuits which will now be dealt with can be in one of two states;

an active state; in this state the pilot circuit establishes the multiplexing;

a passive (waiting) stage; in this state the pilot circuit would behave as a connecting circuit if it were not for the other tasks assigned to it, which will be defined below.

Figure 11:
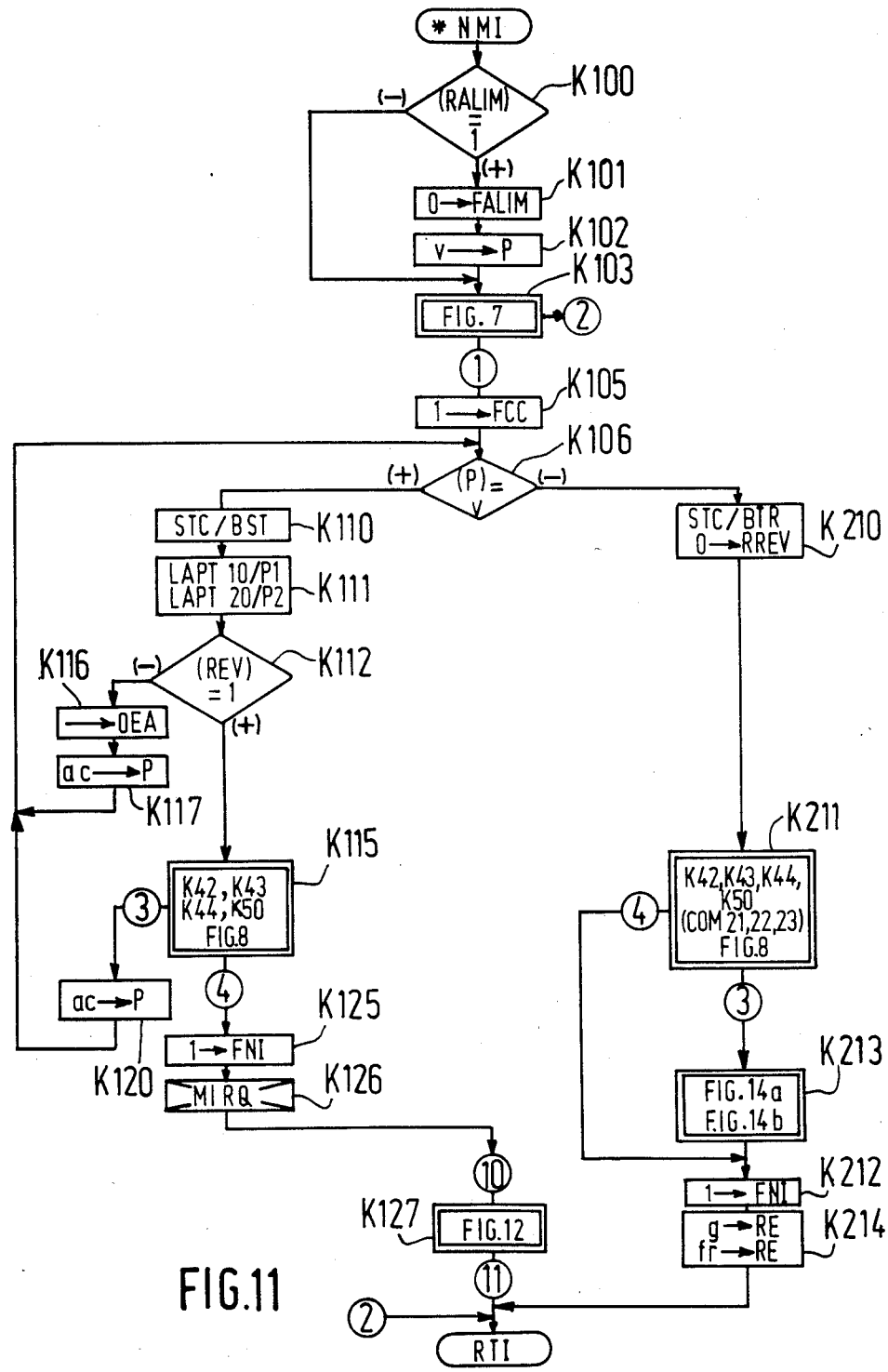
FIGS. 11 and 12 show the flow charts representing the operation of the pilot circuits schematised in FIG. 10.

FIG. 11 shows, in the form of a flow chart, the operations of the pilot circuits. The program for which the flow chart is shown in this FIG. 11 is started as soon as an active signal appears at the input NMI of the microprocessor muP. The test indicated by box K100 is the first operation of the program represented by this flow chart; it consists in testing the contents of the register RALIM: if the signal is "1", it means that the pilot circuit has just been started, in which case the flip-flop FALIM is set to zero (box K101). A word "v" is placed in a memory P (box K102) and the next move is to box K103. If the test indicated in box K100 is negative, the program moves directly to box K103. The box K103 represents the whole flow chart in FIG. 7 starting from the box K0. Reference should therefore be made to the description already given. In box K105 which follows the flip-flop FCC is set to "1", thereby suppressing the short-circuits effected by the contacts KU11, . . . , KU22, KO11, . . . , KO22. Next, in box K106, the contents of memory P are tested. From this box onward the program divides into two branches depending on whether this memory contains the word "v" or not.

The first branch is executed if the memory P contains the word "v", This word "v" conditions the waiting state of the pilot circuit, which behaves for all practical purposes as a connecting circuit. The switch STC (box K110) is set in a position such that the multiplexing on the wire MXE is governed by the receiver time base BST. Next, in box K111, a time lapse is allowed LAPT10 for one of the pilot circuits and a time lapse LAPT20 for the other pilot circuit. These time lapses are different and are defined so as to give a priority to one of the pilot circuits at the time the system is started. After a defined time lapse in box K112 a test is made of the contents of the order receiver register REV; if the waiting order has been received from the other pilot circuit, the contents of REV is "1" and the program passes to box K115; if this order has not been received, the next box is K116, which indicates that a waiting order has been sent in the direction of the far pilot circuit; then, in box K117, the word "ac" is placed in memory P which, in box K106, will lead the program to its second branch which will be described below. In box K115 different words are sent into the register COM in an attempt to obtain synchronisation of the receiver time base BST. For this purpose the operations are carried out which have already been indicated in boxes K42, K43, K44 and K50 in FIG. 8. If synchronisation is not possible, box K115 is left at point 3 for box K120 where the operation is indicated that consists in placing the word "ac" in the memory P. From box K120 a move is made to box K106 to concentrate on the second branch of the program. If synchronisation has been obtained, box K115 is left at point 4; the flip-flop FNI is set to "1" (box K125) and the mask is removed (box K126) which had been applied in box K0 (see K103). The move is then to box K127 for which the operations are elucidated in FIG. 12.

The second branch of the program begins at box K210. Here, by the operation of switch STC, the output multiplex is made dependent on the transmission time base BTR and the flip-flop RREV is set to zero. Next, an attempt is made to obtain synchronisation of the receiver time base BST by means of the operations indicated in box K211. These operations are those indicated in boxes K42, K43, K44 and K50 in FIG. 8; however, it should be noted that in box K50 only the words COM21, COM22, COM23 are tried with a view to obtaining synchronisation. If synchronisation is obtained, there is no need to undertake any further action, and from point 4 of box K211 the program moves to box K212. If synchronisation has not been obtained, it means that there is a serious failure in the system and it is necessary to undertake the reconfiguration procedure (box K213) which is defined in detail in FIGS. 14a and 14b. In box K212 the flip-flop FNI is set to "1" and the words "g", "fr" are sent to box K214, which words, recognised at the level of the connecting circuits, permit the normal operation of the telecommunication system.

Figure 12:
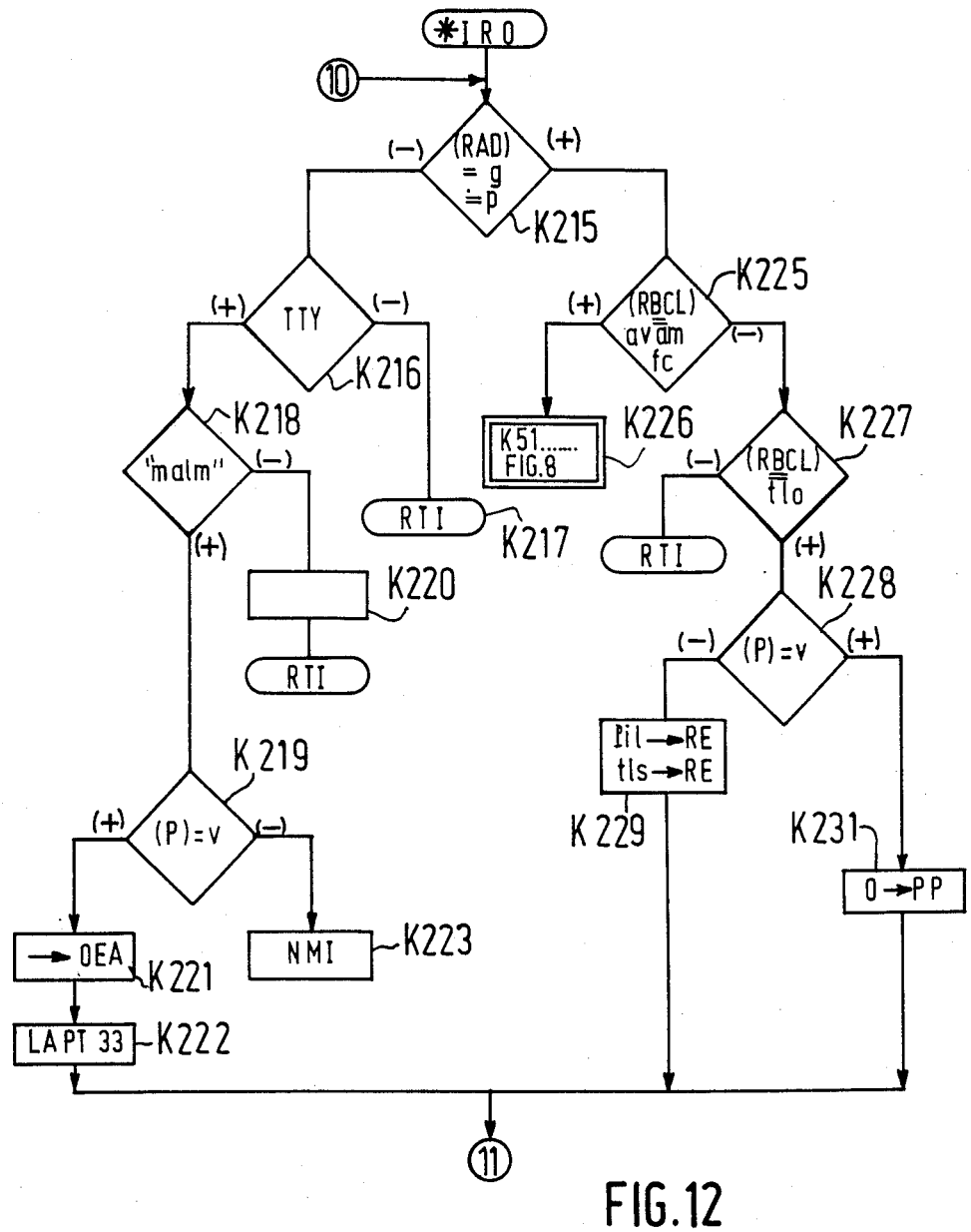

The operations indicated by the flow chart in FIG. 12 may start in two different ways: the first is the sequel of the operations following the operation indicated in box K126; the second is the appearance of an interruption signal applied to the input IRQ of the microprocessor muP. It is known that this signal may appear when a code "p" or "g" is contained in the register RAD, which is tested in box K215. If the test is negative, a test is then made (box K216) to see whether the interruption has been caused by the teleprinter TTY via the interface circuit ACIA. If this test is negative, it is considered that the interruption is purely inadvertent and the interruption program is terminated in box K217. If the test indicated in box K216 is positive, the word supplied by the teleprinter is then examined (box K218); if this word corresponds to a code "malm", the only one considered in the context of the invention, the box K219 is the next to be dealt with; if this word is different from the code just referred to, the next box to be arrived at is K220 which concerns other operations (for example, establishing the list of subscribers to the system . . . ). In box K219, which follows box K218 if the test is positive, the contents of memory P are checked; if these contents identify with code "v", the procedure passes to box K221 where the indicated operation consists in sending a waiting order to the other pilot circuit. A period of waiting LAPT33 then ensues (box K222) during which an active signal should appear on the wire ALT, signifying by its appearance that the other pilot circuit has been set to wait. If nothing happens during this time, no other operation is envisaged. If the test indicated in box K219 is negative, the program moves to box K223. Here a link is effected with the program triggered by a signal at the input NMI of the microprocessor muP, in other words one returns to the box K100.

If the contents of the register RAD identify with one of the two codes "g" and "p" (box K215), a test is next made of the contents of register RBCL (box K225), if these contents identify with one of the codes "av", "am" or "fr", the program passes to box K226 which represents the whole flow chart shown in FIG. 8, the pilot circuit then behaving like a connecting circuit. If the test in box K225 turns out to be negative, the program passes to box K227. Here a further examination is made of the contents of register RBCL to see whether there is identification with the code "tls". This code is sent by the pilot circuits during a remote supervision procedure which will be explained below. If the test indicated in this box K227 is positive, the next box arrived at is K228; if it is negative, no other operation is undertaken. In box K228 a test is made of the contents of memory P. If the code contained in this memory is the code "v", the program passes to box K229 to send a code "tls" accompanied by the address "Pil" from the other pilot circuit. If the test in box K228 is positive, the next box arrived at is K231 where an "0" is placed in memory PP.

Figure 13:
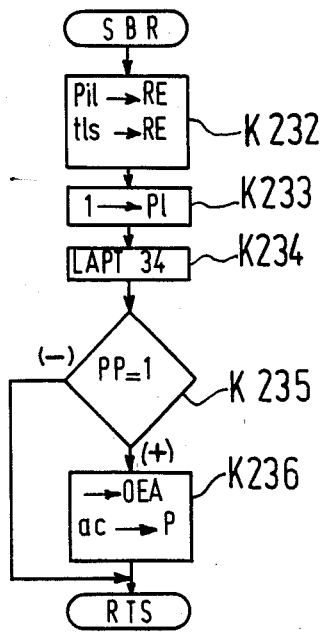
FIG. 13 shows a flow chart representing a remote supervision procedure.

The remote supervision procedure mentioned above consists in supervising the active pilot circuit, which generates the whole multiplexing, by the waiting pilot circuit. This supervision is governed by a sub-program which appears periodically. The flow chart of this sub-program is shown in FIG. 13. In box K232 the code "tls" is sent out, accompanied by the address code "Pil" from the active pilot circuit. Then, in box K233, a "1" is placed in the memory PP. A time lapse LAPT34 is then allowed (box K234) during which the interruption signal may appear and set the memory PP to zero (see box K231). This is tested in box K235; if the memory PP contains an "0", there is no operation to be undertaken; if the contents turn out to be equal to "1", the waiting order is sent along the twisted pair Lp to the other pilot circuit (box K231) and "ac" is placed in the memory P (box K236).

Figure 14A:
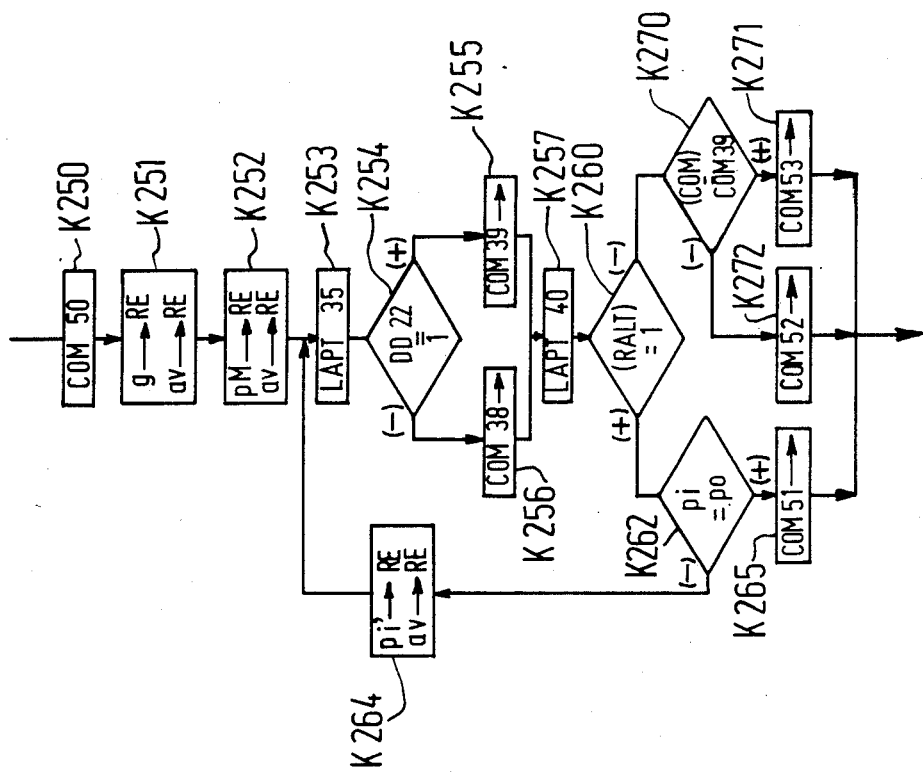
FIGS. 14a and 14b show a flow chart representing a reconfiguration procedure.

The flow chart, a first part of which is shown in FIG. 14a representing the reconfiguration procedure, begins at box K250 where the indicated operation consists in sending into the register COM the word COM50, which triggers switching operations inside the network SW, set forth in Table IV below.

TABLE IV

| Switching word | Switching operations performed within the network SW |
| --- | --- |
| COM50 | IN-S11; IN-S12; IN-e1; s1-OUT |
| COM51 | IN-SU21; IN-SU22; IN-e1; s1-OUT |
| COM52 | IN-S22; IN-S11; s2-SU21; IN-e1; s1-OUT; e2-ED21; s2-SU22 |
| COM53 | IN-S22; IN-S11; s2-SU21; s2-SU22; IN-e1; IN-e1; s1-OUT; e2-ED22 |

Next the words "g", "av" (box K251) are sent out, followed by the word "pM" accompanied by the word "av". The word "pM" corresponds to the particular address of the connecting circuit situated furthest down-line in the direction of transmission defined at the beginning of the present description; a time LAPT35 is allowed to elapse (box K253) and a check is made (box K254) for the appearance of an active signal on the wire DD22; if such a signal is present, the word COM39 is sent (box K255); if it is not, the conclusion is that the active line is DD21 and, without making any supplementary test, the word COM38 is sent (box K256). The word COM38 or the word COM39 having been sent, a time LAPT40 is allowed to elapse (box K257) before making the synchronisation test indicated in box K260. If synchronisation has not been obtained (RALT)=1, the address of the connecting circuit is examined (box K262) to see whether it is the address of the nearest circuit in the above-mentioned direction. If this is not the case, the particular address of the connecting circuit nearer than the one whose address has just previously been sent is put into register RE (box K264). This address is sent out accompanied by the word "av". A return is then made to box K253. If the test indicated in box K262 turns out to be positive, the word COM51 is then sent to the register COM (box K265). When synchronisation has been obtained (box K260), a test is made of the contents of register COM (box K270). If the contents correspond to the word COM39, they are replaced by the word COM53 (box K271); if the contents do not correspond to this word, the word must necessarily be COM38; this latter word is replaced by the word COM52 (box K272).

Figure 14B:
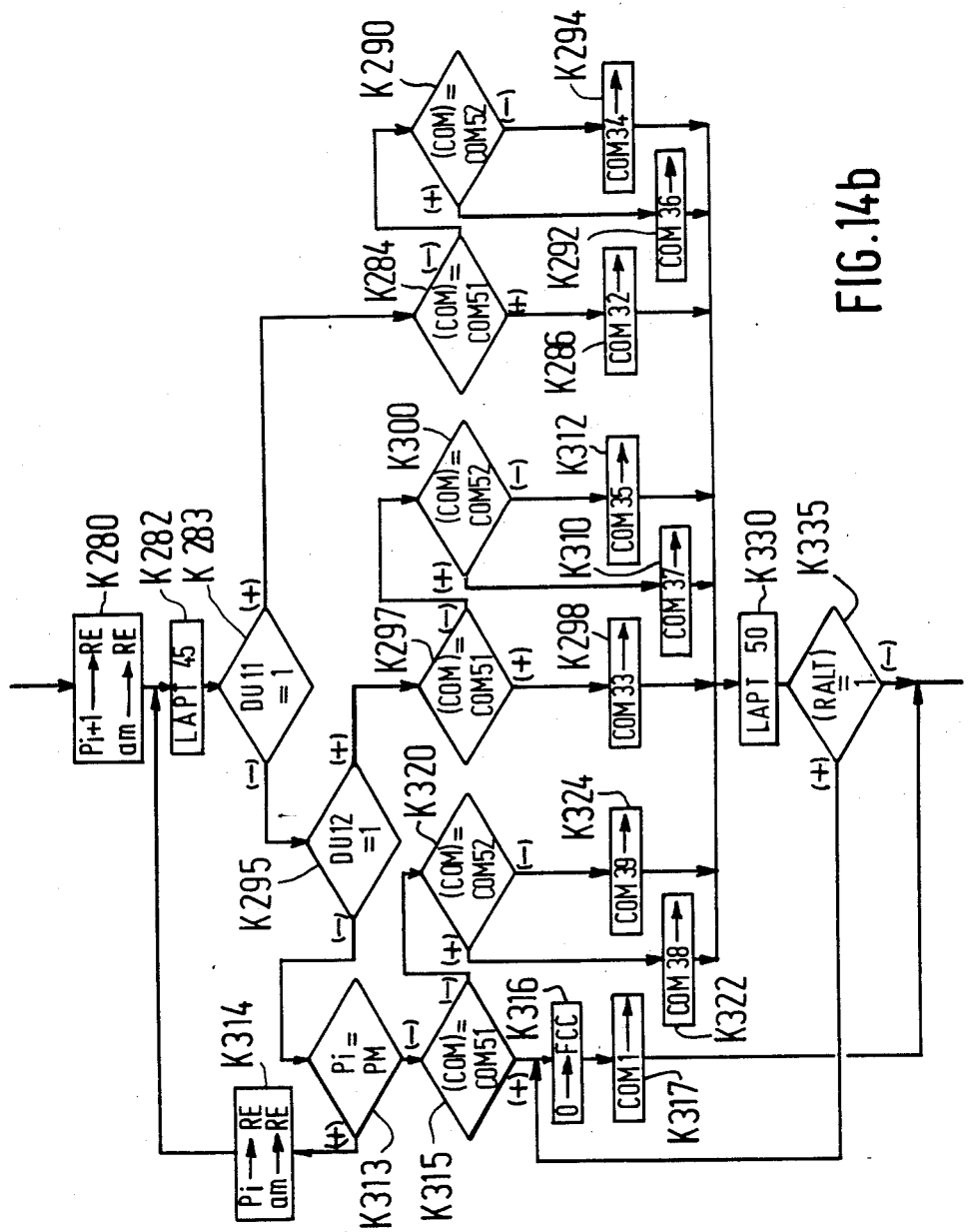

Box K280 marks the beginning of another phase in this reconfiguration procedure, the flow chart for which is shown in FIG. 14b. This box follows on from the boxes K265, K272 and K271. As indicated in this box K280, the address of the connecting circuit situated furthest in the direction opposite to that mentioned in the foregoing, that is to say the furthest down-line, is transmitted; a time LAPT45 is allowed to elapse (box K282) before examining the access point where the return signal will arrive. First of all a check is made to see whether the signal on the line DU11 is active; if it is, the test indicated in box K284 is then carried out, which consists in testing the contents of the register COM; if the contents correspond to the word COM51, the word COM32 is sent into the register COM (box K286). If this does not correspond to the word COM51, it perhaps corresponds to the word COM52; this is tested as indicated in box K290. The correspondence with the word COM52 triggers the transmission of the word COM36 (box K292); non-correspondence triggers the transmission of the word COM34 (box K294). If there is no active signal on the line DU11 (box K283), a check is then made to see whether there is an active signal on the line DU12 (box K295). The presence of the signal leads to a test (box K297) in which the contents of the register COM are compared with the word COM51. If the contents correspond to this word, it is replaced by the word COM33 (box K298); if there is no correspondence, these contents are then tested with the word COM52 (box K300). If the contents of the register COM correspond to the word COM52, the word COM37 is sent into the register COM (box K310); if there is no correspondence, the word COM35 is sent (box K312). The absence of an active signal on both DU11 and DU12 prompts another test of the contents of the register COM with the word COM51 (box K315). If these contents correspond to the word COM51, the flip-flop FCC is triggered in order that the access points of the pilot circuit shall be short-circuited (box K316) and the word COM1 is sent into the register. The reconfiguration procedure is terminated in this case, the pilot circuit being practically eliminated, and the program goes on to box K215 and the following which, due to the short circuit, indicate operations without effect. If the test indicated in box K315 is negative, a test is then made of the contents of register COM to see whether they correspond to the word COM52 (box K320); if there is correspondence, the word COM52 is replaced by the word COM38 (box K322); if there is no correspondence, it is replaced by the word COM39 (box K324). After the operations indicated in boxes K286, K292, K294, K298, K310, K312, K322 and K324 a time LAPT50 is allowed to elapse (box K330) before testing whether the time base BST is synchronised or not (box K335). If there is synchronisation, the program moves on to box K212 (FIG. 11); if there is no synchronisation, it moves on to box K316.

To explain the operation of the telecommunication system in conformity with the invention, it will be shown how the system reacts in the event of a serious failure.

Figure 15:
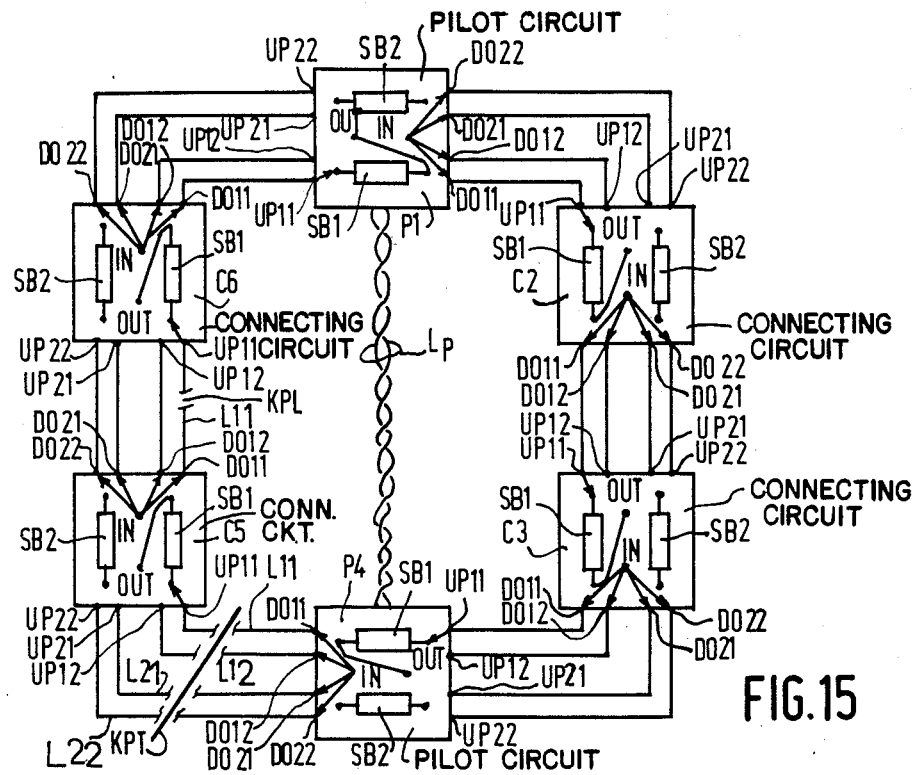
FIGS. 15, 16, 17, 18, 19 and 20 show the method of reconfiguration of a telecommunication system after a serious break in the transmission lines.

In FIG. 15 the system is operating normally when a break KPT occurs in all of the lines L11, L12, L21 and L22 between the circuits P4 and C5 and a break KPL in the line L11 between the circuits C5 and C6. In normal operation the switching network establishes for all the connecting circuits, as well as for the pilot circuits, the electric relations formed by the word COM20. This means in fact that the access points DO11, DO12, DO21 and D022 are connected to the terminal IN and that the terminal OUT is connected to the access point UP11 through the intermediary of the conversion device SB1.

Figure 16:
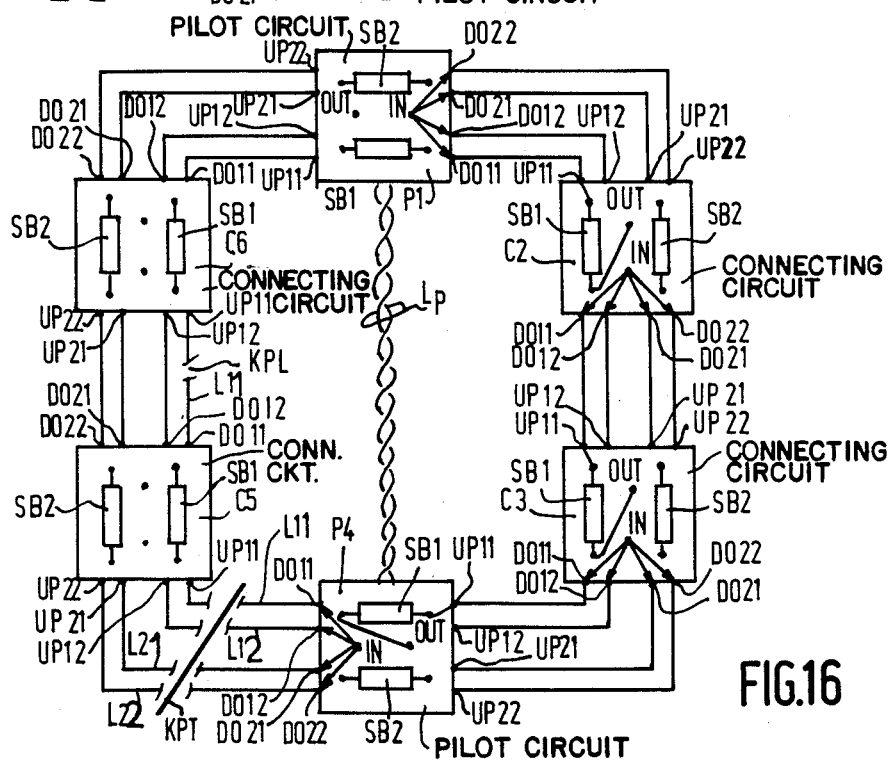

Because of the breaks in the lines, no signal is received at the connecting circuits C5, C6 and the pilot circuit P1; the circuits C5 and C6 are about to execute the program for which the flow charts are shown in FIGS. 7 and 8; since the above-mentioned circuits are supposed to be functioning properly, the program will form a loop on boxes K42, K43, K44, K50, K42, while no signal permitting synchronisation will be detected. In FIG. 16, which represents this case, no connections have been drawn since they change periodically. As the pilot circuit P1 has been unable to obtain synchronisation from the receiving side, it will carry out the self-testing program (K103); just as before the failure, the pilot being considered as not being in the waiting state, the branch of the program for which the flow chart is shown in FIG. 11 will be executed beginning at box K210. The multiplex signal is transmitted along all the lines L11, L12, L21, and L22, the switching word then being COM50; the circuits C2, C3 and P4 will take the configuration indicated in figure 16, that is to say the terminal IN will be connected to the access points DO11, D012, DO21 and DO22, while the terminal OUT is connected to the access point UP11 through the intermediary of the device SB1.

Figure 17:
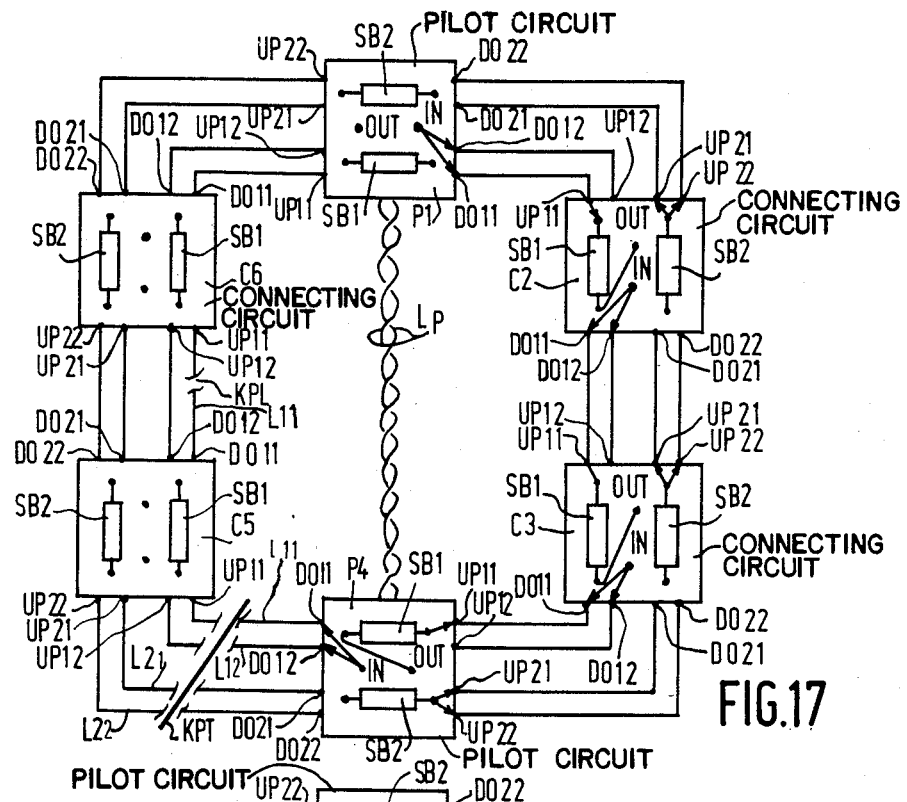

The pilot circuit P1 then performs the operations indicated in box K251, which, in the circuits C2, C3 and P4, which alone receive the multiplex signal, will give rise to the connections shown in FIG. 17 and corresponding to the word COM30; the connections s2-SU21 and s2-SU22 will be noted, that is to say that the output of the synchronisation device SB2 will be connected to the access points UP21 and UP22, in preparation for the return of the multiplex signal in the up-line direction.

Figure 18:
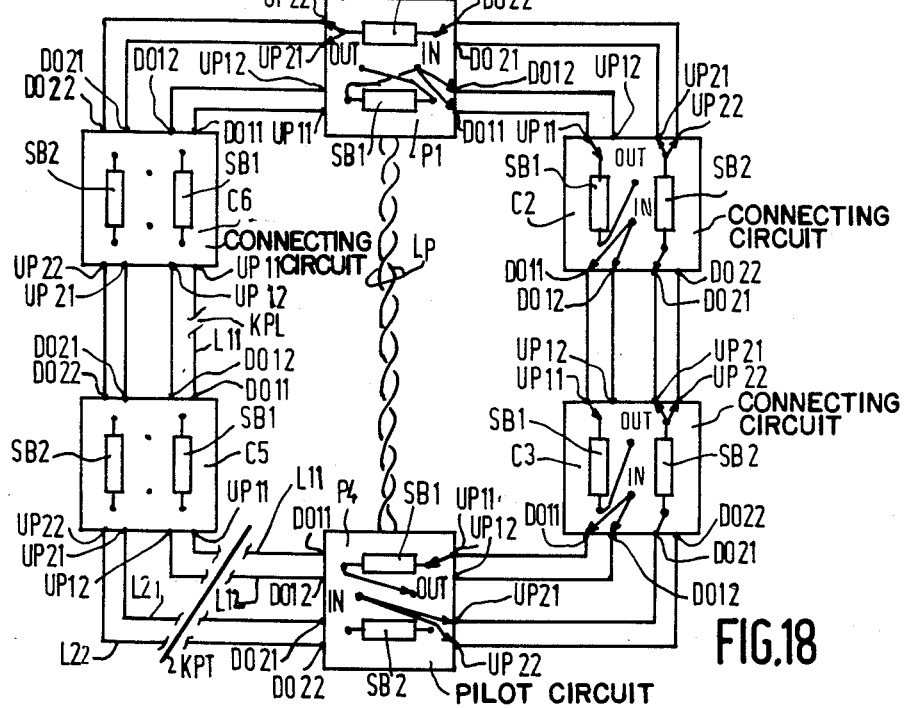

The program of the pilot circuit P1 passes to the box K252 and will trigger the transmission of the order "av" to the circuit furthest down-line, the circuit C6 being the first to be so addressed, then the next furthest circuit C5; these circuits cannot receive this order; it will be executed by the circuit P4 and it is the word COM32 (sent to box K66, FIG. 9) that will govern the connections inside the switching network SW of the circuit P4. The multiplex signal will then appear at the access points UP21 and UP22 of the circuit P4; circuit C3 will detect the signal on the wire DD21 (box K80) and this will give rise to the connections inside the SW network controlled by the word COM36; the pilot circuit P1 detects the presence of a signal on the access point DO22 (box K254), the word COM39 (box K255) is then sent into the register COM, such that the signal available at the access point DO22 will be fed to the receiver time base BST. This is shown in FIG. 18.

Figure 19:
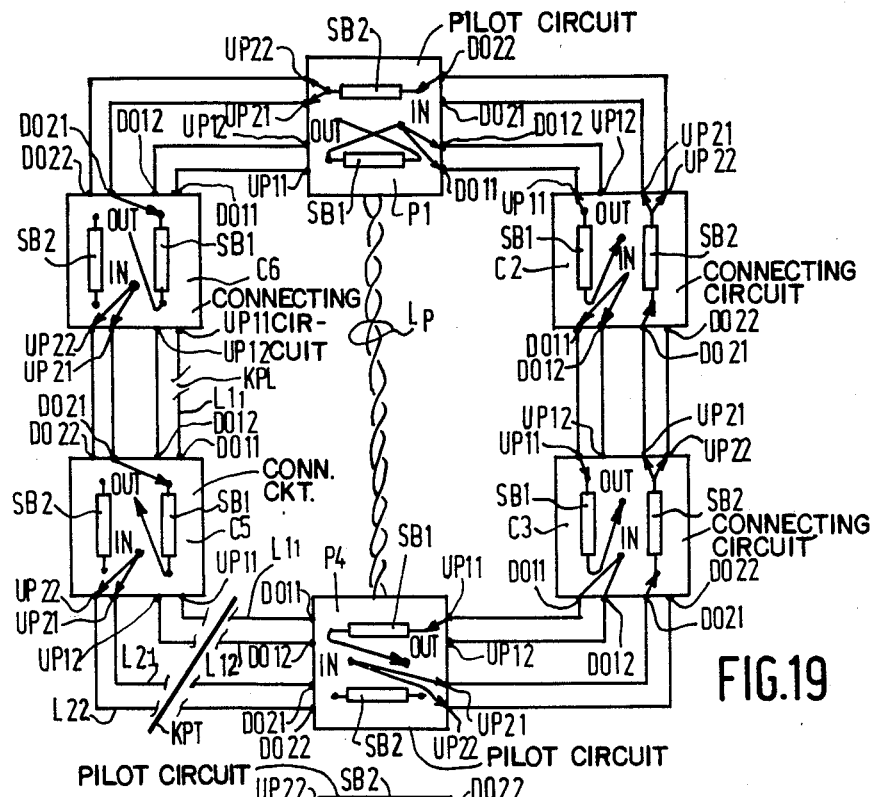

This time base BST will synchronise itself and the program of circuit P1 will end at box K271. The return signal will then be emitted from the up-line side of circuit P1 (see FIG. 19). The circuits C6 and C5, whose program was looped over the boxes K42, K43, K44 and K50, will change their configuration; the words COM24 will govern the connections of the network SW of circuits C6 and C5; the program will then become looped over boxes K95 and K97.

Figure 20:
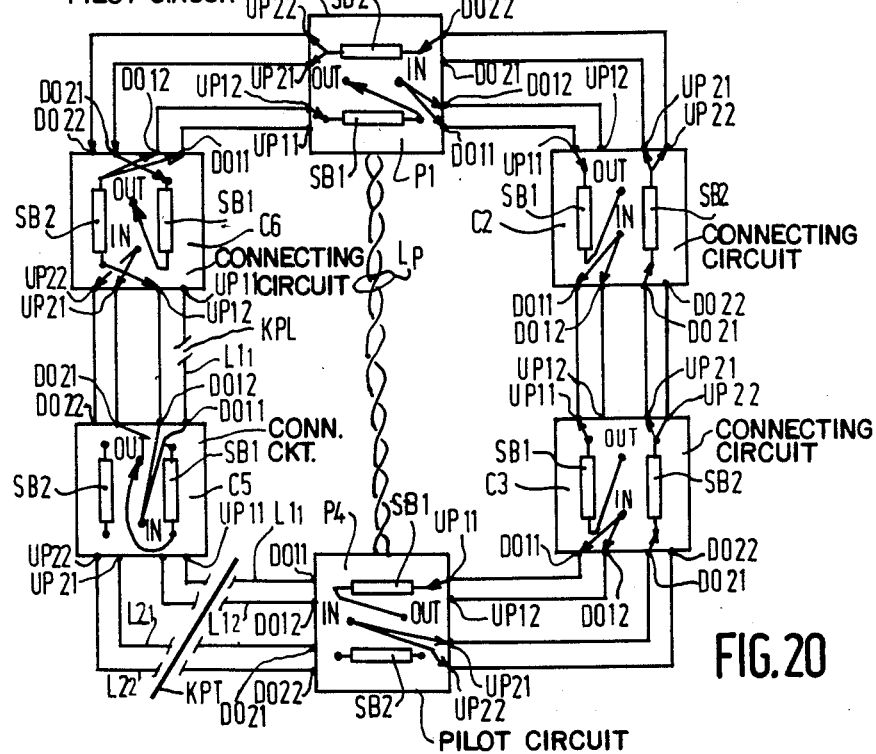

The pilot circuit P1 will issue the order "am" accompanied by the address of the circuit just down-line of that which has executed the order "av" which was particular to it: that is to say that the order "am" will be accompanied by the address of the circuit C5. The program of this circuit will start again from the box K51, triggered by the interruption signal, and will end at box K90 and hence at box K92. The word COM39 will now govern the connections inside C5. A signal will appear solely at the access point UP12 of C6 because of the break KPL; the program of this circuit will leave its loop and end at box K98; the word COM40 will then be sent to the register COM. The signal transmitted by the circuit C6 to the pilot circuit P1 will be detected by this (see boxes K95 and K97); an end in the program will arrive at box K294 and the word COM34 will govern the connections. This is shown in FIG. 20. To return the system to normal operation, the pilot station will issue the order "fr" accompanied by the general address, which is recognised by all the circuits. The operating program started by the signal applied to the input IRQ of the microprocessor muP restarts the program at box K51 and ends it at box K68. The system is thus capable of functioning in the normal way.

Figure 21:
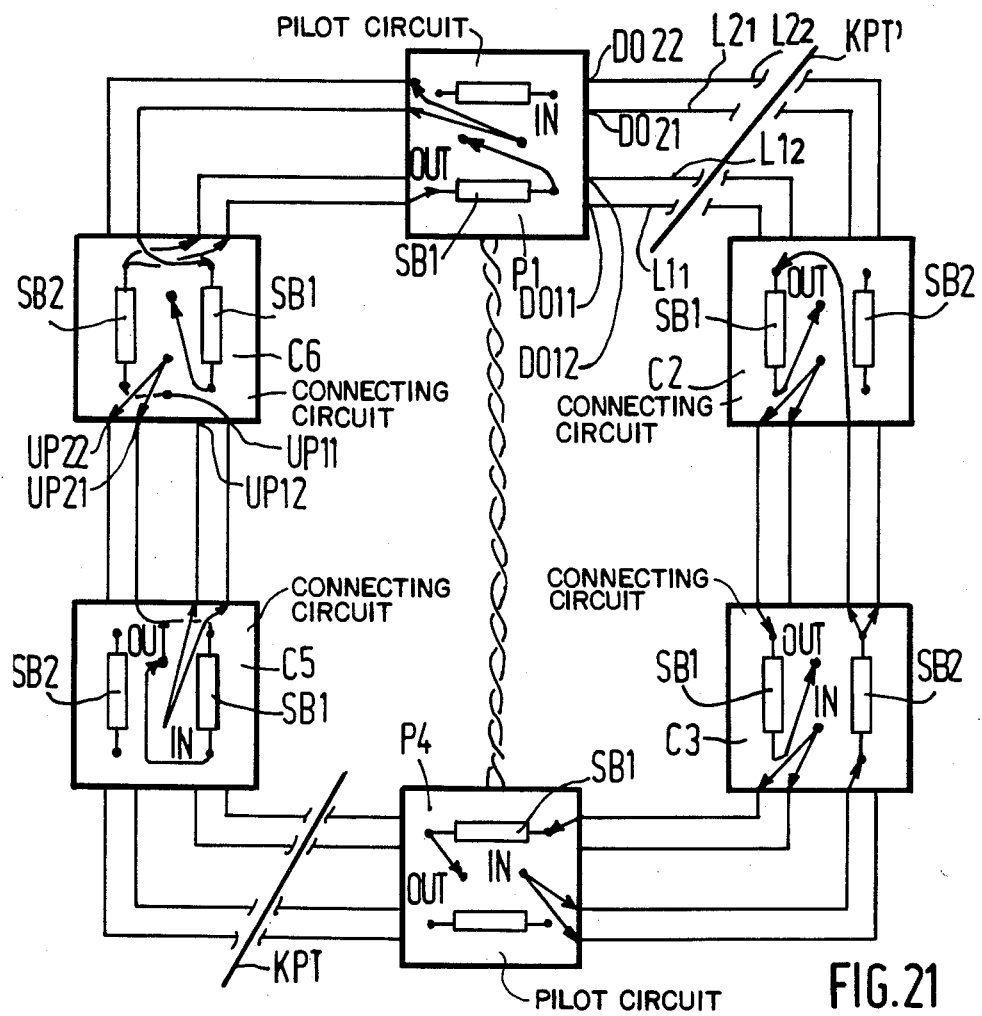
FIG. 21 shows how the telecommunication system organises itself after two serious breaks in the transmission lines.

It is interesting to examine how the telecommunication system in accordance with the invention reacts when a double break occurs. This case is represented in FIG. 21. A first break referenced by KPT is situated between the circuit P4 and the circuit C5 and a second break referenced by KPT' is situated between the circuit P1 and the circuit C2. It is given that the system was functioning normally and that the two breaks KPT and KPT' appeared at the same time. At the level of circuits C2 and C5 an active signal will appear on the wires ALT. The operation of these circuits will be governed by the program whose flow chart is shown in FIG. 7. Consequently, the operation of all the other connecting circuits will successively proceed in the same manner, while that of the pilot circuits will be governed by the program whose flow chart is shown in FIG. 11. It is therefore appropriate to examine more exactly the operation of these two pilot circuits. To this end we refer to the box K111 (FIG. 11); the operations will determine the active pilot circuit (for example, the pilot circuit P1) and the pilot circuit P4 will be set to the waiting state. The box K115 will define the operation of the waiting pilot circuit; as it will not come into synchronization, it is necessary to consider point 3 of the output of this box K115. We end at the box K120 where the code "ac" is placed in the memory P and, from here, we end at box K210, which makes the pilot circuit P4 active. This pilot circuit P4, like pilot circuit P1 but in an independent manner, will then initiate a reconfiguration procedure in such a way that, on the one hand, the subscribers connected to circuits C5 and C6 will be able to exchange information and that, on the other hand, the subscribers connected to circuits C2 and C3 will also be able to exchange information.

If these breaks KPT and KPT' are repaired, the system will have to be returned to its normal operation. For this purpose, starting from one of the pilot circuits P1 or P4, the code "malm" is formed by means of the teleprinter; this produces a signal at the input IRQ of the microprocessor muP, and this brings us to the box K218 and from there to the box K223, that is to say we return to box K100 and then to box K102 where "v" is placed in the memory P, which will henceforth conduct the execution of the operations indicated in K110, K112, K116, K117 and then K210. By virtue of the operation indicated in box K116, the other pilot circuit will be placed in the waiting state, while that where the code "malm" has been formed will remain active. The system will then be put into normal service.

We may examine the case where, in a system functioning normally, the code "malm" is formed by the teleprinter in a waiting pilot circuit. This will interrupt the production of the synchronisation code of the pilot which is active (see box K221, FIG. 12), which will cause the appearance of the active signal on the wire ALT of the pilot circuit from which the code "malm" has been formed. The function operations will be defined by the boxes K100, K101, K102, K103, K105, K106, K110, K111, K112, and then K116, K117, K106 and K210. This pilot circuit is thus, from this moment on, in the active state. The functioning of the other pilot circuits will be governed by the operations indicated by boxes K100 to K105, and then K106, K110, K111, K112, K115, which clearly defines its waiting state.

Figure 22:
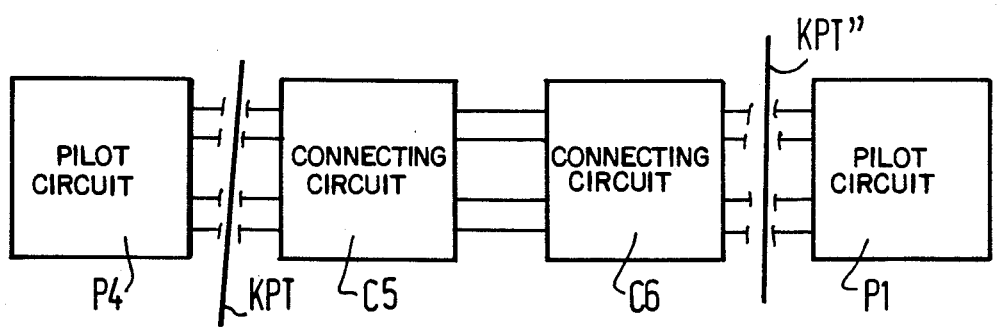
FIG. 22 illustrates the return to service of connecting circuits isolated by two serious breaks.

FIG. 22 shows the case where a double break KPT and KPT' occurs between, on the one hand, the circuits P4 and C5 and on the other hand, C6 and P1. To return these circuits to the system after repair of the out lines, the code "malm" is reformed starting at a teleprinter in a pilot circuit and these circuits are inserted again into the system.

The system here described may be implemented in a different manner without thereby departing from the framework of the invention. In particular, the lines L11, L12, L21, L22 may be constituted by optical fibres. Optical devices exist which are capable of fulfilling the short-circuit function performed by the contacts KU11, ..., KU22, K011, ... K022.

What is claimed is:

1. A time-division multiplex loop telecommunication system comprising: first and second transmission lines linking a succession of connecting circuits in a continuous loop through which binary coded information is normally transmitted in a down-line direction through the loop; each connecting circuit having input and output terminals for connection thereto of one or more subscriber circuits, and further having up-line access points respectively coupled to the incoming transmission lines and down-line access points respectively coupled to the outgoing transmission lines; means for transmitting multiplex synchronizing signals through said loop; and each connecting circuit comprising switching means responsive to such synchronizing signals to connect the input terminals of such connecting circuit to one of the up-line access points thereof to receive information from said loop and to connect the output terminals of such connecting circuit to the down-line access points thereof to transmit information into said loop; such switching means being adapted, in the event of a break in one of the incoming transmission lines to such connecting circuit, to reconnect the output terminals of such connecting circuit to the up-line access point which is coupled to the other incoming transmission line so as to permit continued transmission in the down-line direction.

2. A loop telecommunication system as claimed in claim 1, further comprising at least one transmission line supplementary to at least one of said first and second transmission lines, each of said connecting circuits having supplementary up-line and down-line access points connected to said supplementary transmission line.

3. A loop telecommunication system as claimed in claim 1 further comprising at least one pilot circuit connected in said loop, said pilot circuit being responsive to an interruption in transmission of said synchronizing signals to transmit binary coded order words in said loop; said connecting circuits being responsive to such order words to compensate for a loop failure causing such interruption by altering the connections between the access points and the input and output terminals thereof.

4. A loop telecommunication system as claimed in claim 3, wherein in response to a transmission interruption caused by a loop failure said pilot circuit is adapted to:
    send an initial order word in the down-line direction to all connecting circuits in said loop which enables them to transmit in the up-line direction;
    successively send secondary order words in the down-line direction which uniquely address each of said connecting circuits, beginning with the connecting circuit most down-line from such pilot circuit, thereby causing the last connecting circuit up-line of said loop failure to return its secondary order word in the up-line direction to the pilot circuit; and
    successively send tertiary order words in the up-line direction which uniquely address each of said connecting circuits, beginning with the connecting circuit next down-line of the connecting circuit which returned said secondary order word;
and wherein the connecting circuits through which said secondary order word is returned and to which said tertiary order words are addressed are responsive to such order words to reconfigure the connections between their access points and their input and output terminals to permit continued transmission of information between connecting circuits up-line of such loop failure and between connecting circuits down-line of such loop failure.

5. A loop telecommunication system as claimed in any of claims 1, 2, 3 or 4, wherein each of said connecting circuits comprise means for executing a self-test program to detect malfunction of such connecting circuit, and means controlled by such malfunction detecting means for short-circuiting the up-line access points to the down-line access points of such connecting circuit when such a malfunction is detected.

6. A loop telecommunication system as claimed in either of the claims 3 and 4, further comprising two of said pilot circuits each of which can be put into a waiting state or an active state, a pilot circuit in the active state producing said synchronizing signals and a pilot circuit in the waiting state providing connections between input and output terminals and up-line and down-line access points thereof as in said connecting circuits.

7. A loop telecommunication system as claimed in claim 6, in which the two pilot circuits are linked by an auxiliary transmission line over which waiting orders can be transmitted from one to the other pilot circuit.

8. A loop telecommunication system as claimed in claim 7, in which each of said pilot circuits includes means for initiating a remote supervision program comprising:
- periodically sending from the waiting pilot circuit a remote supervision code word along said auxiliary transmission line to the pilot circuit in the active state;
- sending from the active pilot circuit to the waiting pilot circuit a code word acknowledging reception of the remote supervision code word if it has been received; and
- changing the active pilot circuit to the waiting state if the code word acknowledging reception of the remote supervision code word is not returned thereby to the waiting pilot circuit.

9. A loop telecommunication system as claimed in claim 3, wherein each of said connecting circuits and said pilot circuit comprises a synchronization circuit connected to an access point thereof receiving information from said loop and which delivers a synchronization alarm signal if said synchronizing signals are not received at such access point, such alarm signal initiating the implementation of a reconnection program, for such connecting circuit and such pilot circuit comprising:
- selecting an alternative access point of such circuit for receiving information from said loop;
- selecting access points of such circuit for transmitting information into said loop; and
- short-circuiting such selected access points.

10. A loop telecommunication system as claimed in claim 9, wherein each of said connecting circuits further comprises a detection circuit responsive to said alarm signal to initiate implementation of said reconnection program.

11. A loop telecommunication system as claimed in claim 7, wherein each of said pilot circuits comprises a manual control device to initiate the active state of such pilot circuit and, for a pilot circuit in the waiting state, the transmission of a waiting order from that pilot circuit to the other pilot circuit.

* * * * *